United States Patent
Guo et al.

(10) Patent No.: US 10,097,505 B2
(45) Date of Patent: Oct. 9, 2018

(54) METHOD FOR INITIATING LOCAL ROUTING COMMUNICATION, BASE STATION APPARATUS, AND TERMINAL APPARATUS

(71) Applicant: Huawei Technologies Co., Ltd., Shenzhen (CN)

(72) Inventors: Yali Guo, Shenzhen (CN); Wanqiang Zhang, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 68 days.

(21) Appl. No.: 15/231,447

(22) Filed: Aug. 8, 2016

(65) Prior Publication Data
US 2016/0344686 A1  Nov. 24, 2016

Related U.S. Application Data

(63) Continuation of application No. PCT/CN2014/071907, filed on Feb. 8, 2014.

(51) Int. Cl.
*H04L 12/28* (2006.01)
*H04L 29/12* (2006.01)
(Continued)

(52) U.S. Cl.
CPC ...... *H04L 61/2007* (2013.01); *H04L 12/6418* (2013.01); *H04W 8/005* (2013.01);
(Continued)

(58) Field of Classification Search
USPC ....... 370/331, 231, 235, 236, 329, 312, 315, 370/389, 390, 341, 347, 400, 401, 410,
(Continued)

(56) References Cited

U.S. PATENT DOCUMENTS 8,179,903 B2 * 5/2012 Gupta .................. H04L 12/287
370/329
2009/0232019 A1 9/2009 Gupta et al.

FOREIGN PATENT DOCUMENTS

CN    102821435 A    12/2012
WO    2010039085 A1   4/2010
(Continued)

OTHER PUBLICATIONS

3GPP TS 23.401, 3rd Generation Partnership Project; Technical Specification Group Services and System Aspects; General Packet Radio Service (GPRS) enhancements for Evolved Universal Terrestrial Radio Access Network (E-UTRAN) access, Dec. 2013, 302 pages, V12.3.0, France.
(Continued)

*Primary Examiner* — Phuongchau Ba Nguyen
(74) *Attorney, Agent, or Firm* — Slater Matsil, LLP

(57) ABSTRACT

A method includes initiating, by a base station, a local routing service start notification. The local routing service start notification is used for notifying a terminal apparatus that a local routing service is to be started. The method also includes receiving, by the base station apparatus, a local routing service request message sent by the terminal apparatus. The method further includes determining, according to the local routing service request message, that the terminal apparatus supports the local routing service. An IP address is assigned to the terminal apparatus, and a first assignment message is sent to the terminal apparatus. The first assignment message includes the IP address assigned to the terminal apparatus.

20 Claims, 9 Drawing Sheets

(51) Int. Cl.
*H04L 12/64* (2006.01)
*H04W 8/00* (2009.01)
*H04W 40/24* (2009.01)
*H04W 80/04* (2009.01)
*H04W 88/16* (2009.01)

(52) U.S. Cl.
CPC .......... *H04W 40/246* (2013.01); *H04W 80/04* (2013.01); *H04W 88/16* (2013.01)

(58) Field of Classification Search
USPC ........................ 370/432, 434, 471, 492, 501
See application file for complete search history.

(56) References Cited

FOREIGN PATENT DOCUMENTS

| | | | |
|---|---|---|---|
| WO | 2010062093 | A2 | 6/2010 |
| WO | 2010133030 | A1 | 11/2010 |

OTHER PUBLICATIONS

Marvell, Local Breakout support for HNB/HeNB case, 3GPP TSG SA WG2 Meeting #67, TD S2-085618, Aug. 25-29, 2008, 2 pages, Sophia Antipolis, France.

Vodafone, Local Breakout and Home (e)NodeB, 3GPP TSG SA WG2 Meeting #72, TD S2-0092301, Mar. 30-Apr. 3, 2009, 4 pages, Hangzhou, China.

* cited by examiner

METHOD FOR INITIATING LOCAL ROUTING COMMUNICATION, BASE STATION APPARATUS, AND TERMINAL APPARATUS

CROSS-REFERENCE TO RELATED APPLICATIONS

This application is a continuation of International Application No. PCT/CN2014/071907, filed on Feb. 8, 2014, which is hereby incorporated by reference in its entirety.

TECHNICAL FIELD

The present disclosure relates to the field of communications, and in particular embodiments, to a method, an apparatus, and a terminal for initiating local routing communication.

BACKGROUND

Wireless communications technologies are being widely applied in the field of public safety. LTE has been selected as a communications technology in a public safety network in some other countries, and spectrum selection for public safety networks is also under discussion in Europe, where LTE is an important candidate communications technology in the spectrum selection for public safety networks. In the field of public safety, occurrence of various disastrous situations such as fire and earthquakes needs to be considered. When these disasters occur, a base station may lose a connection to a core network and becomes an isolated base station, or a communication capacity between a base station and a core network is greatly limited and only communication between a part of control plane signaling and a core network may be ensured. In these cases, the base station is still expected to provide a service for a user equipment (UE) within coverage of the base station.

In an LTE communications system, a terminal is connected to a mobility management entity (MME)/service gateway (SGW) of a core network through an evolved base station (eNodeB), and is connected to a packet data network gateway (PGW, PDN) through the SGW. The terminal performs non-access stratum signaling interaction with the MME, and these pieces of signaling are transparently transmitted through the eNB.

Short distance discovery and communications technologies are applicable to public safety scenarios; however, because a distance between UEs is strictly limited in the short distance discovery and communications technologies, two UEs between which a distance is relatively far, for example, about 10 meters, cannot discover each other, let alone perform communication.

SUMMARY

In view of this, embodiments provide a method, a base station, and a terminal apparatus for initiating a local routing service, so as to implement communication between terminal apparatuses within coverage of a base station apparatus in a case of not interacting with a core network. The technical solutions of the present disclosure are applicable to various wireless communications systems, such as a Global System for Mobile Communications (GSM for short), a general packet radio service (GPRS for short) system, a Code Division Multiple Access (CDMA for short) system, a CDMA2000 system, a Wideband Code Division Multiple Access (WCDMA for short) system, a Long Term Evolution (LTE for short) system, and a World Interoperability for Microwave Access (WiMAX for short) system.

A base station may be a base station controller (BSC for short) in a GSM system, a GPRS system, or a CDMA system, may be an evolved base station (Evolved NodeB, eNB for short) in an LTE system, or may be a network element, such as an access service network base station (Access Service Network Base Station, ASN BS for short), in a WiMAX network. A UE may be a device such as a mobile phone or a tablet computer. The present disclosure is described by using an eNB and a UE as examples; however, types of the base station and the terminal apparatus are not limited.

According to a first aspect, the present disclosure provides a method for initiating a local routing service, including: initiating, by an evolved base station (eNodeB, eNB for short), a local routing service start notification, where the local routing service start notification is used for notifying a user equipment UE that the eNB starts a local routing service; receiving, by the eNB, a local routing service request message sent by a first UE; and determining, according to the local routing service request message, that the first UE supports the local routing service, assigning an IP address to the first UE, and sending a first assignment message to the first UE, where the first assignment message includes the IP address assigned to the first UE.

In a possible implementation manner of the first aspect, the present disclosure provides a manner for assigning the IP address to the first UE: sending a first IP request message to a session management module of the eNB, where the first IP request message is used for requesting the session management module to send a second IP request message to a registration and routing module of the eNB, and the second IP request message is used for requesting the registration and routing module to assign an IP address to the first UE; and receiving the IP address assigned to the first UE, where the IP address assigned to the first UE is obtained from the session management module, and the session management module obtains the IP address according to the registration and routing module.

In a possible implementation manner of the first aspect, the present disclosure provides a manner for determining, according to the local routing service request message, that the first UE supports the local routing service, and assigning the IP address to the first UE: sending, by the eNB, the local routing service request message to a mobility management entity MME on a network side; determining, by the MME according to the local routing service request message, that the first UE supports the local routing service, where the local routing service request message is further used for requesting the MME to send a first IP request message to a packet data network gateway PGW on the network side, and the first IP request message is used for requesting the PGW to assign an IP address to the first UE; and receiving the first assignment message, where the first assignment message includes the IP address of the first UE, and the IP address of the first UE is determined by the PGW; sending, by the PGW, a second assignment message to the MME, where the second assignment message includes the IP address of the first UE; and determining, by the MME, the first assignment message according to the second assignment message.

In another possible implementation manner of the first aspect, the local routing service request message carries a local routing service request identifier, and the eNB determines, according to the local routing service request identifier, that the first UE supports the local routing service.

In still another possible implementation manner of the first aspect, the local routing service request identifier is set in an RRC signaling message established by the first UE and the eNB.

In yet another possible implementation manner of the first aspect, the local routing service start notification is a new message that carries a local routing service start identifier, or is a system broadcast message, carrying a local routing service start identifier, of the eNB.

In yet another possible implementation manner of the first aspect, the determining that the first UE supports the local routing service includes: determining that the local routing service request identifier indicates that the first UE has a capability of the local routing service; and/or determining that the local routing service request identifier indicates that the first UE requests obtaining of the local routing service.

In yet another possible implementation manner of the first aspect, the local routing service request identifier is any one or a combination of: a specific APN (Access Point Name), a specific network attach type, and ID information in a specific format of the first UE.

In yet another possible implementation manner of the first aspect, the message carrying the local routing service request identifier can be used for initiating a network attach request message or initiating creation of a packet data network.

In yet another possible implementation manner of the first aspect, the method further includes: receiving a local routing service registration request message, where the local routing service registration request message carries a user identifier of the first UE and the assigned IP address that is obtained; sending a user identifier list to the first UE, where the user identifier list includes an identifier of at least one UE that supports the local routing service; receiving an identifier of a target UE sent by the first UE, where the identifier of the target UE is an identifier of a UE in the user identifier list; and querying, by using the identifier of the target UE, a relationship between the user identifier list and a user IP address to obtain an IP address of the target UE, and sending the IP address of the target UE to the first UE.

In yet another possible implementation manner of the first aspect, the process of sending the user identifier list to the first UE is: sending the first IP request message to the session management module on the network side, where the first IP request message is used for requesting the session management module to send the second IP request message to the registration and routing module on the network side, and the second IP request message is used for requesting the registration and routing module on the network to assign an IP address, and is further used for requesting the registration and routing module on the network side to deliver the user identifier list; and receiving a first IP assignment message and the user identifier list that are sent by the session management module on the network side, where the first IP assignment message carries the IP address of the first UE, and the first IP assignment message is determined according to second IP assignment information that is sent by the registration and routing module on the network side and received by the session management module.

In yet another possible implementation manner of the first aspect, the querying, by using the identifier of the target UE, a relationship between the user identifier list and a user IP address is: sending a first querying request message to a local routing server on the network side to request the local routing server to query the IP address of the target UE; and receiving a first target IP message sent by the local routing server, where the first target IP message includes the IP address of the target UE, and the IP address of the target UE is obtained by the local routing server by querying the relationship between the UE identifier list and a user IP address.

In yet another possible implementation manner of the first aspect, the method further includes: sending a user identifier list to the first UE, where the user identifier list includes an identifier of at least one UE that supports the local routing service; receiving an identifier of a target UE sent by the first UE, where the identifier of the target UE is an identifier of a UE in the user identifier list; and querying, by using the identifier of the target UE, a relationship between the user identifier list and a user IP address to obtain an IP address of the target UE, and sending the IP address of the target UE to the first UE.

In yet another possible implementation manner of the first aspect, the method further includes: sending the first IP request message to the session management module on the network side, where the first IP request message is used for requesting the session management module to send the second IP request message to the registration and routing module on the network side, and the second IP request message is used for requesting the registration and routing module on the network to assign an IP address, and is further used for requesting the registration and routing module on the network side to deliver the user identifier list; and receiving a first IP assignment message and the user identifier list that are sent by the session management module on the network side, where the first IP assignment message carries the IP address of the first UE, and the first IP assignment message is determined according to second IP assignment information that is sent by the registration and routing module on the network side and received by the session management module.

In yet another possible implementation manner of the first aspect, before the step of sending a user identifier list to the first UE, the method further includes: receiving the local routing service registration request message, where the local routing service registration request message carries the user identifier of the first UE and the IP address of the first UE; and storing the user identifier of the first UE and the IP address of the first UE in a list of UE that support the local routing service.

In yet another possible implementation manner of the first aspect, the method further includes: setting the IP address of the first UE and the user identifier list in a same message and sending the message to the first UE.

In yet another possible implementation manner of the first aspect, the method further includes: detecting, by the eNB, a situation of a connection to a core network, determining whether to start the local routing service, and when determining that the eNB cannot perform necessary data transmission with the core network, determining to start the local routing service.

In yet another possible implementation manner of the first aspect, the determining that the eNB cannot perform necessary data transmission with the core network includes: determining that a connection failure occurs between the eNB and the core network; or detecting that a data transmission bandwidth between the eNB and a core network node SGW is limited and is insufficient to support a data transmission requirement of a UE within a coverage area of the eNB.

In yet another possible implementation manner of the first aspect, the user identifier is a user identifier of an application layer; or the user identifier is an MSISDN number; or the user identifier is a username allocated by a local routing service application.

In yet another possible implementation manner of the first aspect, the local routing service registration request message is a user-defined application layer message.

In yet another possible implementation manner of the first aspect, the method further includes: screening, according to a rule, identifiers of all UEs that support the local routing service, to obtain a part of the user identifier list, and sending the part of the user identifier list to the first UE.

In yet another possible implementation manner of the first aspect, the rule is to select a UE equipment that has a same packet identifier as the first UE and supports the local routing service.

According to a second aspect, the present disclosure provides a method for initiating a local routing service, including: receiving, by a first UE, a local routing service start notification, where the local routing service start notification is used for determining to start a local routing service; sending a local routing service request message to an eNB, where the local routing service request message is used for requesting the eNB to assign an IP address to the first UE; and receiving the IP address of the first UE.

In a possible implementation manner of the second aspect, the local routing service request message carries a local routing service request identifier; and the local routing service request identifier is used for notifying the eNB that the first UE supports the local routing service.

In another possible implementation manner of the second aspect, the local routing service start notification is a new message that carries a local routing service start identifier, or is a system broadcast message, carrying a local routing service start identifier, of the eNB.

In still another possible implementation manner of the second aspect, the requesting the eNB to assign an IP address to the first UE includes that: the local routing service request identifier indicates that the first UE has a capability of the local routing service; and/or the local routing service request identifier indicates that the first UE requests obtaining of the local routing service.

In yet another possible implementation manner of the second aspect, the local routing service request identifier is any one or a combination of multiple of the following forms: a specific APN (Access Point Name), a specific network attach type, and ID information in a specific format of the first UE.

In yet another possible implementation manner of the second aspect, the message carrying the local routing service request identifier can be used for initiating a network attach request message or initiating creation of a packet data network; or the local routing service request identifier is set in an RRC signaling message established by the first UE and the eNB.

In yet another possible implementation manner of the second aspect, the method further includes: sending a local routing service registration request message, where the local routing service registration request message carries a user identifier of the first UE and the assigned IP address that is obtained; receiving a user identifier list, where the user identifier list includes an identifier of at least one UE that supports the local routing service; selecting a target UE, where the selected target UE is a target with which the first UE expects to communicate, and sending an identifier of the target UE, where the identifier of the target UE is used for requesting obtaining of an IP address of the target UE, and the identifier of the target UE is an identifier of a UE in the user identifier list; and receiving the IP address of the target UE.

In yet another possible implementation manner of the second aspect, the method further includes: receiving a user identifier list, where the user identifier list includes an identifier of at least one UE that supports the local routing service; selecting a target UE, where the selected target UE is a target with which the first UE expects to communicate, and an identifier of the target UE is an identifier of a UE in the user identifier list; sending the identifier of the target UE, where the identifier of the target UE is used for requesting obtaining of an IP address of the target UE; and receiving the IP address of the target UE.

In yet another possible implementation manner of the second aspect, a received message including the IP address of the first UE further includes the user identifier list.

In yet another possible implementation manner of the second aspect, the user identifier is a user identifier of an application layer; or the user identifier is an MSISDN number; or the user identifier is a username allocated by a local routing service application.

In yet another possible implementation manner of the second aspect, the local routing service registration request message is a user-defined application layer message.

According to a third aspect, the present disclosure provides a base station apparatus, including: a sending unit, configured to initiate a local routing service start notification, where the local routing service start notification is used for notifying a user equipment UE equipment that a local routing service is to be started; a receiving unit, configured to receive a local routing service request message sent by a first UE; and a determining unit, configured to determine, according to the local routing service request message, that the first UE supports the local routing service, and assign an IP address to the first UE, where the sending unit is further configured to send a first assignment message to the first UE, where the first assignment message includes the IP address assigned to the first UE.

In a possible implementation manner of the third aspect, that the determining unit assigns an IP address to the UE includes: sending a first IP request message to a session management module of the base station apparatus, where the first IP request message is used for requesting the session management module to send a second IP request message to a registration and routing module of an eNB, and the second IP request message is used for requesting the registration and routing module to assign an IP address to the first UE; and receiving the IP address assigned to the first UE, where the IP address assigned to the first UE is obtained from the session management module, and the session management module obtains the IP address of the first UE according to the registration and routing module.

In another possible implementation manner of the third aspect, the determining unit is configured to: send the local routing service request message to a mobility management entity MME on a network side; determine, by the MME according to the local routing service request message, that the first UE supports the local routing service, where the local routing service request message is further used for requesting the MME to send a first IP request message to a packet data network gateway entity PGW on the network side, and the first IP request message is used for requesting the PGW to assign an IP address to the first UE; and receive the first assignment message, where the first assignment message includes the IP address of the first UE, and the IP address of the first UE is determined by the PGW;

the PGW sends a second assignment message to the MME, where the second assignment message includes the IP address of the first UE; and the MME determines the first assignment message according to the second assignment message.

In still another possible implementation manner of the third aspect, the local routing service request message carries a local routing service request identifier; and the eNB determines, according to the local routing service request identifier, that the first UE supports the local routing service.

In yet another possible implementation manner of the third aspect, the local routing service request identifier is set in an RRC signaling message established by the first UE and the eNB.

In yet another possible implementation manner of the third aspect, the local routing service start notification sent by the sending unit is a new message that carries a local routing service start identifier, or is a system broadcast message, carrying a local routing service start identifier, of the eNB.

In yet another possible implementation manner of the third aspect, that the determining unit determines that the first UE supports the local routing service includes: determining that the local routing service request identifier indicates that the first UE has a capability of the local routing service; and/or determining that the local routing service request identifier indicates that the first UE requests obtaining of the local routing service.

In yet another possible implementation manner of the third aspect, the local routing service request identifier received by the receiving unit is any one or a combination of multiple of the following forms: a specific APN (Access Point Name), a specific network attach type, and ID information in a specific format of the first UE.

In yet another possible implementation manner of the third aspect, the message of the local routing service request identifier received by the receiving unit can be used for initiating a network attach request message or initiating creation of a packet data network; or the message of the local routing service request identifier received by the receiving unit is set in an RRC signaling message established by the first UE and the eNB.

In yet another possible implementation manner of the third aspect, the base station apparatus further includes a second receiving unit, configured to receive a local routing service registration request message, where the local routing service registration request message carries a user identifier of the first UE and the assigned IP address that is obtained; a second sending unit, configured to send a user identifier list to the first UE, where the user identifier list includes an identifier of at least one UE that supports the local routing service, where the second receiving unit is further configured to receive an identifier of a target UE sent by the first UE, where the identifier of the target UE is an identifier of a UE in the user identifier list; and a second determining unit, configured to determine an IP address of the target UE, where the IP address of the target UE is obtained by querying a relationship between the user identifier list and a user IP address by using the identifier of the target UE, where the second sending unit is further configured to send the IP address of the target UE to the first UE.

In yet another possible implementation manner of the third aspect, that the second sending unit is configured to send the user identifier list to the first UE includes: sending a first identifier request message to a local routing server on the network side, where the first identifier request message is used for requesting the local routing server to deliver the identifier list; receiving a first identifier list message sent by the local routing server on the network side, where the first identifier list message includes the identifier list; and obtaining the user identifier list from the first identifier list message, and sending the user identifier list to the first UE.

In yet another possible implementation manner of the third aspect, that the second determining unit is configured to determine the IP address of the target UE includes: sending a first querying request message to a local routing server on the network side to request the local routing server to query the IP address of the target UE; and receiving a first target IP message sent by the local routing server, where the first target IP message includes the IP address of the target UE, and the IP address of the target UE is obtained by the local routing server by querying the relationship between the UE identifier list and a user IP address.

In yet another possible implementation manner of the third aspect, the base station apparatus further includes: a third sending unit, configured to send a user identifier list to the first UE, where the user identifier list includes an identifier of at least one UE that supports the local routing service; a third receiving unit, configured to receive an identifier of a target UE sent by the first UE, where the identifier of the target UE is an identifier of a UE in the user identifier list; and a third determining unit, configured to determine an IP address of the target UE, where the IP address of the target UE is obtained by querying a relationship between the user identifier list and a user IP address by using the identifier of the target UE, where the third sending unit is further configured to send the IP address of the target UE to the first UE.

In yet another possible implementation manner of the third aspect, that the third determining unit is configured to determine the IP address of the target UE includes: sending the first IP request message to the session management module on the network side, where the first IP request message is used for requesting the session management module to send the second IP request message to the registration and routing module on the network side, and the second IP request message is used for requesting the registration and routing module on the network to assign an IP address, and is further used for requesting the registration and routing module on the network side to deliver the user identifier list; and receiving a first IP assignment message and the user identifier list that are sent by the session management module on the network side, where the first IP assignment message carries the IP address of the first UE, and the first IP assignment message is determined according to second IP assignment information that is sent by the registration and routing module on the network side and received by the session management module.

In yet another possible implementation manner of the third aspect, before the second sending unit sends the user identifier list to the first UE, the second receiving unit is further configured to receive the local routing service registration request message, where the local routing service registration request message carries the user identifier of the first UE and the IP address of the first UE; and the base station further includes a memory, configured to store the user identifier of the first UE and the IP address of the first UE in a list of UE that support the local routing service.

In yet another possible implementation manner of the third aspect, that the second sending unit is configured to send the user identifier list to the first UE further includes: setting the IP address of the first UE and the user identifier list in a same message and sending the message to the first UE.

In yet another possible implementation manner of the third aspect, before the sending unit sends the local routing service start notification, the base station apparatus further includes a detecting unit, configured to detect a situation of a connection to a core network, determine whether to start the local routing service, and when it is determined that an eNB cannot perform necessary data transmission with the core network, determine to start the local routing service.

In yet another possible implementation manner of the third aspect, the detecting and determining that an eNB cannot perform necessary data transmission with the core network includes: determining that a connection failure occurs between the eNB and the core network; or detecting that a data transmission bandwidth between the eNB and a core network node SGW is limited and is insufficient to support a data transmission requirement of a UE within a coverage area of the eNB.

In yet another possible implementation manner of the third aspect, the user identifier is a user identifier of an application layer; or the user identifier is an MSISDN number; or the user identifier is a username allocated by a local routing service application.

In yet another possible implementation manner of the third aspect, the local routing service registration request message is a user-defined application layer message.

In yet another possible implementation manner of the third aspect, that the second sending unit is configured to send the user identifier list to the first UE further includes: screening, according to a rule, identifiers of all UEs that support the local routing service, to obtain a part of the user identifier list, and sending the part of the user identifier list to the first UE.

In yet another possible implementation manner of the third aspect, that the second sending unit screens, according to the rule, the identifiers of all the UEs that support the local routing service includes that: the rule is to select a UE equipment that has a same packet identifier as the first UE and supports the local routing service.

According to a fourth aspect, a terminal apparatus is provided, including a receiving unit, configured to receive a local routing service start notification, where the local routing service start notification is used for determining to start a local routing service; and a sending unit, configured to send a local routing service request message to an eNB, where the local routing service request message is used for requesting the eNB to assign an IP address to a first UE, and the local routing service request message carries a local routing service request identifier, where the receiving unit is further configured to receive the IP address of the first UE.

In a possible implementation manner of the fourth aspect, the local routing service request message carries the local routing service request identifier; and the local routing service request identifier is used for notifying the eNB that the first UE supports the local routing service.

In another possible implementation manner of the fourth aspect, the local routing service start notification received by the receiving unit is a new message that carries a local routing service start identifier, or is a system broadcast message, carrying a local routing service start identifier, of the eNB.

In still another possible implementation manner of the fourth aspect, the local routing service request message sent by the sending unit is: used for indicating that the first UE has a capability of the local routing service; and/or used for indicating that the first UE requests obtaining of the local routing service.

In yet another possible implementation manner of the fourth aspect, the local routing service request identifier sent by the sending unit is any one or a combination of multiple of the following forms: a specific APN (Access Point Name), a specific network attach type, and ID information in a specific format of the first UE.

In yet another possible implementation manner of the fourth aspect, the message that carries the local routing service request identifier and is sent by the sending unit can be used for initiating a network attach request message or initiating creation of a packet data network; or the local routing service request identifier is set in an RRC signaling message established by the terminal apparatus and the eNB.

In yet another possible implementation manner of the fourth aspect, the terminal apparatus includes: a second sending unit, configured to send a local routing service registration request message, where the local routing service registration request message carries a user identifier of the first UE and the assigned IP address that is obtained; a second receiving unit, configured to receive a user identifier list, where the user identifier list includes an identifier of at least one UE that supports the local routing service; and a determining unit, configured to select a target UE according to the user identifier list, where the selected target UE is a target with which the first UE expects to communicate, and an identifier of the target UE is an identifier of a UE in the user identifier list, where the second sending unit is further configured to send the identifier of the target UE, where the identifier of the target UE is used for requesting obtaining of an IP address of the target UE; and the second receiving unit is further configured to receive the IP address of the target UE.

In yet another possible implementation manner of the fourth aspect, the terminal apparatus further includes: a third receiving unit, configured to receive a user identifier list, where the user identifier list includes an identifier of at least one UE that supports the local routing service; a third determining unit, configured to select a target UE, where the selected target UE is a target with which the first UE expects to communicate, and an identifier of the target UE is an identifier of a UE in the user identifier list; and a third sending unit, configured to send the identifier of the target UE, where the third receiving unit is further configured to receive the IP address of the target UE.

In yet another possible implementation manner of the fourth aspect, a message that includes the user identifier list and is received by the third receiving unit further includes the IP address of the first UE.

In yet another possible implementation manner of the fourth aspect, the user identifier includes: a user identifier of an application layer or an MSISDN number or a username allocated by a local routing service application.

In yet another possible implementation manner of the fourth aspect, the sent local routing service registration request message is a user-defined application layer message.

According to the foregoing solutions, the embodiments provide a method, a base station, and a terminal apparatus for initiating a local routing service, so that an eNB can assign an IP address, used in local routing, to a user equipment according to a request of the user equipment, and the user equipment can use the assigned IP address to initiate a local routing service, thereby implementing communication between terminal apparatuses within coverage of a base station apparatus in a case of not interacting with a core network.

DETAILED DESCRIPTION OF ILLUSTRATIVE EMBODIMENTS

Embodiments give method embodiments for implementing steps and methods in the foregoing method embodiments. The technical solutions in the embodiments are clearly described in the following with reference to the accompanying drawings in the embodiments. Apparently, the described embodiments are a part rather than all of the embodiments. All other embodiments obtained by a person skilled in the art based on the embodiments without creative efforts shall fall within the protection scope of the present disclosure. In the embodiments, a terminal apparatus uses that a terminal apparatus is a user equipment (UE for short) as an example; a base station apparatus uses an evolved base station (evolved NodeB, eNB for short) as an example; and all claims involving the terminal apparatus and the base station apparatus are required to be protected.

Figure 1:
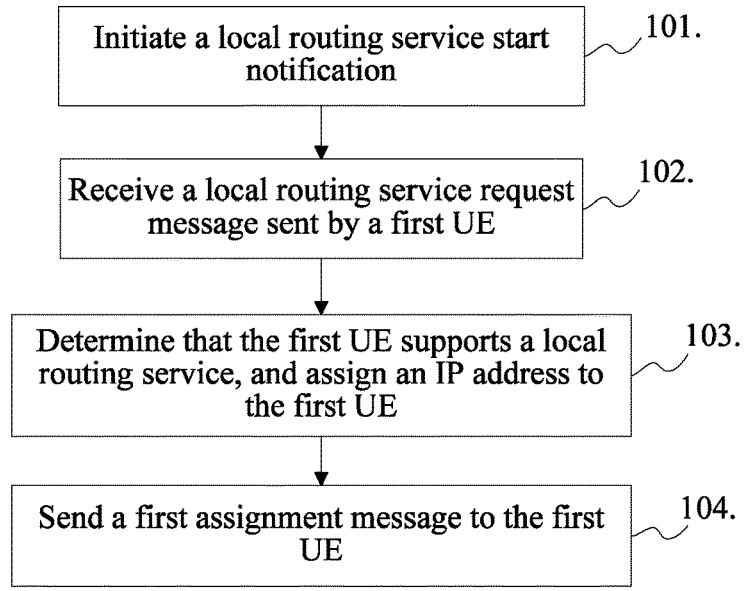
FIG. 1 is a flowchart of a local routing method implemented by a first base station apparatus or evolved base station apparatus according to the present disclosure.

FIG. 1 shows a block diagram of a method for initiating a local routing service. The method includes the following.

Step 101: An eNB initiates a local routing service start notification, where the local routing service start notification is used for notifying a user equipment UE that a local routing service is to be started; and the local routing service means that UE apparatuses within coverage of a same eNB can complete communication in a case of not performing data interaction with a core network.

Optionally, the local routing service start notification in step 101 may be, but is not limited to, a new message that carries a local routing service start identifier, or is a system broadcast message, carrying a local routing service start identifier, of the eNB. It should be understood that, the local routing service start notification may be a message in another form, which is not limited in the present disclosure.

Step 102: The eNB receives a local routing service request message sent by a first UE.

Optionally, the local routing service request message received by the eNB in step 102 may carry a local routing service request identifier, and the eNB determines, according to the local routing service request identifier, that the first UE supports the local routing service.

Optionally, the local routing service request identifier in step 102 may be, but is not limited to, any one or a combination of multiple of the following forms. In a first aspect, a specific APN (Access Point Name), where optionally, an APN style dedicated for the local routing service is configured on the first UE: localroutingservice@chinamobile.com, and when the first UE expects to obtain the local routing service, the first UE sends, to the eNB, a request message carrying the APN. In a second aspect, a specific network attach type (Attach Type), where optionally, 3 is taken as a value of the Attach Type to indicate that a UE expects to obtain a local routing service, and when the first UE expects to obtain the local routing service, the first UE sends, to the eNB, a request message carrying an attach type having a specific value. In a third aspect, ID information of the first UE, where the ID information of the first UE can be used for identifying whether the first UE has a capability of obtaining the local routing service, and optionally, a part of a UE ID is configured to have a specific format, for example, some bits in an encoding format of the UE ID have specific values, for example, the UE ID may be in the form of a mobile subscriber integrated services digital network number MSISDN (Mobile Subscriber International ISDN/PSTN number), in which 121 is taken for the first three bits, so that 121******* represents that the UE has a capability of obtaining the local routing service. It should be understood that, a UE ID is not limited to the form of an MSISDN, and may be ID information in a specific format of the first UE, or an identifier in another form.

Optionally, the message carrying the local routing service request identifier in step 102 can be used for initiating a network attach request message or initiating creation of a packet data network PDN (Packet Data Network).

Step 103: Determine, according to the local routing service request message, that the first UE supports the local routing service, and assign an IP address to the first UE.

In an embodiment, in step 103, it is determined, according to the local routing service request message, that the local routing service request identifier indicates that the first UE has a capability of the local routing service. In another embodiment, it is determined that the local routing service request identifier indicates that the first UE requests obtaining of the local routing service. It should be understood that, the local routing service request identifier may indicate any message, and indicates that the first UE supports establishment, with the eNB, of communication corresponding to the local routing service.

Correspondingly, for a UE that cannot read the local routing service start notification of the eNB in step 102, when the eNB checks that a local routing service request identifier is not included in which a local routing service request identifier that should be carried, or the eNB checks that a message that the UE should request starting of the local routing service in another manner is invalid, the UE still initiates, to the eNB, sending of an attach request to a common core network, or creation of a PDN connection request. For the connection request, optionally, the eNB returns a failure message, so as to avoid a waste of subsequent signaling.

Step 104: Send a first assignment message to the first UE, where the first assignment message includes the IP address assigned to the first UE.

In some cases, when the first UE needs to keep communication with another UE within coverage of a local eNB, or an eNB determines that communication within coverage within which interaction with a switched network is not performed needs to be started, the eNB may start the local routing service, notify the user equipment UE that the local routing service is to be started, assign an IP address to the UE according to the received local routing service request of the UE, and initiate the local routing service, thereby ensuring local communication with a special demand or under a special condition.

Figure 2:
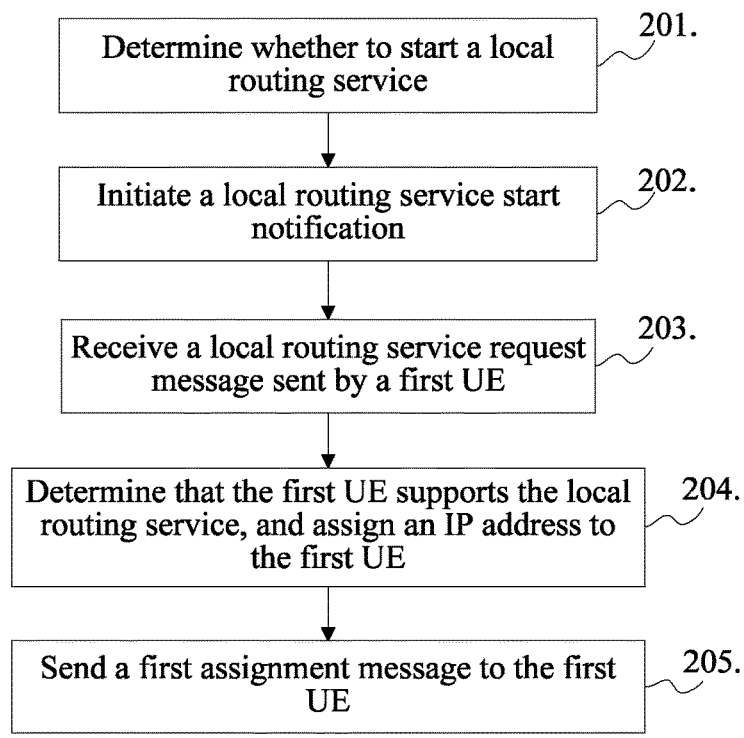
FIG. 2 is a flowchart of a local routing method implemented by a second base station apparatus or evolved base station apparatus according to the present disclosure.

FIG. 2 shows another embodiment, including the following.

Step 201: An eNB may detect a situation of a connection to a core network, determine whether to start a local routing service, and when determining that the eNB cannot perform necessary data transmission with the core network, determine to start the local routing service.

In an embodiment, the eNB determines that a connection failure occurs between the eNB and the core network. For example, when detecting that a connection between the eNB and the core network is lost and signaling communication or data communication cannot be performed, the eNB determines to start the local routing service.

In another embodiment, when detecting that a data transmission bandwidth between the eNB and a core network node SGW is limited and is insufficient to support a data transmission requirement of a UE within a coverage area of the eNB, the eNB determines to start the local routing service.

It should be understood that, a condition under which the eNB determines to start the local routing service is not limited to the foregoing cases, and when the eNB determines a case in which it is necessary to start the local routing service, the eNB executes subsequent methods or steps in this solution.

Step 202 to step 205 and various optional embodiments have already been described in step 101 to step 104 in the embodiment shown in FIG. 1, and are not described in detail herein again.

In some cases, the eNB cannot communicate with the core network; in the cases, when the first UE needs to keep communication with another UE within coverage of a local eNB, the eNB may start the local routing service, thereby ensuring local communication with a special demand or under a special condition. It should be noted that, that the eNB cannot communicate with the core network is a specific example of a trigger condition, and when determining and/or obtaining a notification of another device, the eNB may also start the local routing service; and in another case, a manner in which the eNB starts the local routing service is not limited in the present disclosure.

Figure 3:
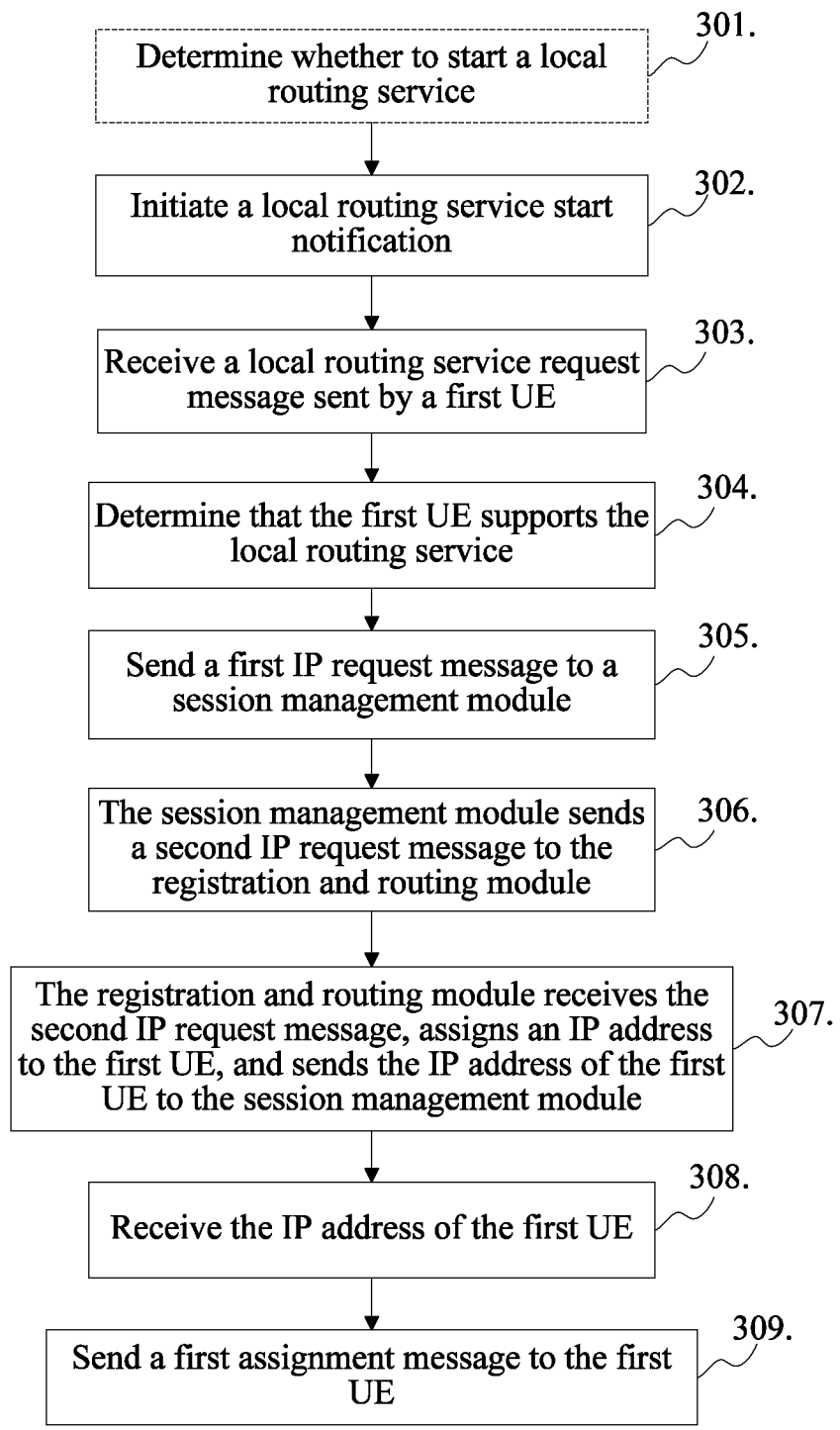
FIG. 3 is a flowchart of a local routing method implemented by a third base station apparatus or evolved base station apparatus according to the present disclosure.

FIG. 3 shows still another embodiment, including the following.

Step 302: An eNB initiates a local routing service start notification, where the local routing service start notification is used for notifying a user equipment UE that a local routing service is to be started; and the local routing service means that UE apparatuses within coverage of a same eNB can complete communication in a case of not performing data interaction with a core network.

Optionally, the local routing service start notification in step 302 may be, but is not limited to, a new message that carries a local routing service start identifier, or is a system broadcast message, carrying a local routing service start identifier, of the eNB. It should be understood that, the local routing service start notification may be a message in another form, which is not limited in the present disclosure.

Optionally, before step 302, according to step 201 in the embodiment shown in FIG. 2, the eNB may detect a situation of a connection to the core network, determine whether to start the local routing service, and when determining that the eNB cannot perform necessary data transmission with the core network, determine to start the local routing service.

In an embodiment, the eNB determines that a connection failure occurs between the eNB and the core network. For example, when detecting that a connection between the eNB and the core network is lost and signaling communication or data communication cannot be performed, the eNB determines to start the local routing service.

In another embodiment, when detecting that a data transmission bandwidth between the eNB and a core network node SGW is limited and is insufficient to support a data transmission requirement of a UE within a coverage area of the eNB, the eNB determines to start the local routing service.

It should be understood that, a condition under which the eNB determines to start the local routing service is not limited to the foregoing cases, and when the eNB determines a case in which it is necessary to start the local routing service, the eNB executes subsequent methods or steps in this solution.

Step 303: The eNB receives a local routing service request message sent by a first UE.

Optionally, the local routing service request message sent by the first UE and received by the eNB in step 303 may carry a local routing service request identifier, and the eNB determines, according to the local routing service request identifier, that the first UE supports the local routing service.

Optionally, the local routing service request identifier in step 303 may be, but is not limited to, any one or a combination of multiple of the following forms: a first aspect: a specific APN (Access Point Name), where optionally, an APN style dedicated for the local routing service is configured on the first UE: localroutingservice@chinamobile.com, and when the first UE expects to obtain the local routing service, the first UE sends, to the eNB, a request message carrying the APN; a second aspect: a specific network attach type (Attach Type), where optionally, 3 is taken as a value of the Attach Type to indicate that a UE expects to obtain a local routing service, and when the first UE expects to obtain the local routing service, the first UE sends, to the eNB, a request message carrying an attach type having a specific value; and a third aspect: ID information of the first UE, where the ID information of the first UE can be used for identifying whether the first UE has a capability of obtaining the local routing service, and optionally, a part of a UE ID is configured to have a specific format, for example, some bits in an encoding format of the UE ID have specific values, for example, the UE ID may be in the form of a mobile subscriber integrated services digital network number MSISDN (Mobile Subscriber International ISDN/PSTN number), in which 121 is taken for the first three bits, so that 121******** represents that the UE has a capability of obtaining the local routing service. It should be understood that, a UE ID is not limited to the form of an MSISDN, and may be ID information in a specific format of the first UE, or an identifier in another form.

Optionally, the message carrying the local routing service request identifier in step 303 can be used for initiating a network attach request message or initiating creation of a packet data network.

In an embodiment, in step 303, it is determined, according to the local routing service request message, that the local routing service request identifier indicates that the first UE has a capability of the local routing service. In another embodiment, it is determined that the local routing service request identifier indicates that the first UE requests obtaining of the local routing service. It should be understood that, the local routing service request identifier may indicate any message, and indicates that a UE requests establishment, with the eNB, of communication corresponding to the local routing service.

Step 304: Determine, according to the local routing service request message, that the first UE supports the local routing service.

Step 305: The eNB sends a first IP request message to a session management module of the eNB, where the first IP request message is used for requesting the session management module to request a registration and routing module of the eNB to assign an IP address.

Step 306: The session management module sends a second IP request message to the registration and routing module according to the first IP request message, where the second IP request message is used for requesting assignment of an IP address to the first UE.

Step 307: The registration and routing module receives the second request message, assigns an IP address to the first UE, and sends the IP address of the first UE to the session management module.

It should be understood that, a bearer message for the IP address is not limited in step 307, and the bearer message may be, but is not limited to, a newly created message, or an existing message used for the registration and routing module to communicate with the session and management module. It should be understood that, the first IP request message and the second IP request message may be newly created messages, or may use existing messages.

Step 308. The eNB receives the IP address assigned to the first UE, where the IP address assigned to the first UE is obtained from the session management module.

It should be understood that, a bearer message for the IP address is not limited in step 308, and the bearer message may be, but is not limited to, a newly created message, or an existing message used for the session management module to communicate with the eNB.

Step 309: The eNB sets the IP address in a first assignment message, and sends the first assignment message to the first UE, where the first assignment message includes the IP address assigned to the first UE.

It should be understood that, correspondences between entity modules and working methods involved in the embodiment shown in FIG. 3 are not limited, and various combinations, divisions, and logical replacements of different modules are required to be protected in the present disclosure. In addition, the modules shown in the embodiments are not limited to being located inside the eNB.

In some cases, the eNB cannot communicate with the core network; in the cases, when the first UE needs to keep communication with another UE within coverage of a local eNB, the eNB may start the local routing service, thereby ensuring local communication with a special demand or under a special condition. A specific implementation manner is that: A session management module and a registration and routing module are integrated inside the eNB, and after receiving the local routing service request message, the eNB assigns, through the session management module and the registration and routing module, an IP address to the first UE that sends the local routing service request message, so as to complete starting of the local routing service. It should be noted that, that the eNB cannot communicate with the core network is a specific example of a trigger condition, and when determining and/or obtaining a notification of another device, the eNB may also start the local routing service; and in another case, a manner in which the eNB starts the local routing service is not limited in the present disclosure.

Figure 4:
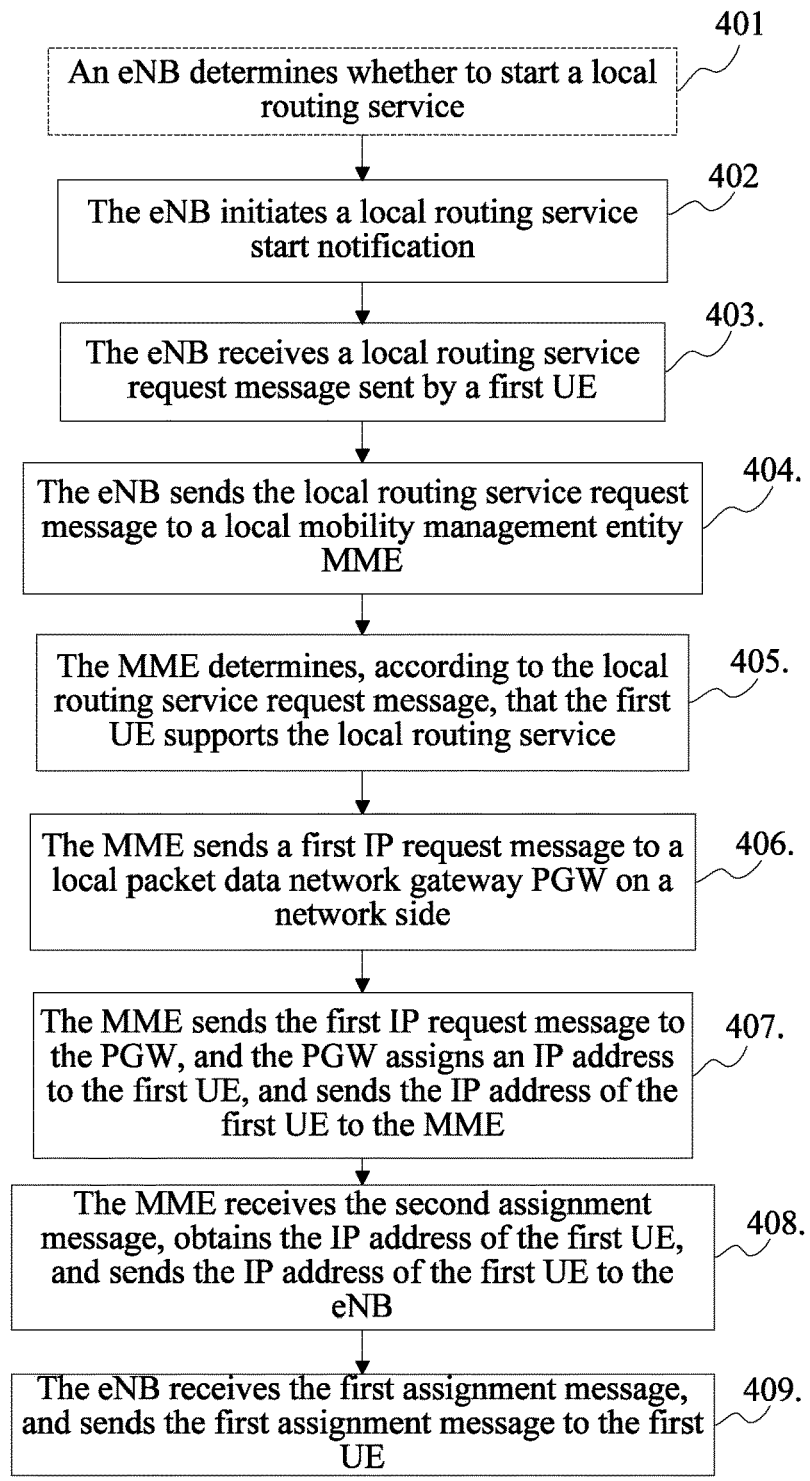
FIG. 4 is a flowchart of a local routing method implemented by a fourth base station apparatus or evolved base station apparatus according to the present disclosure.
Figure 5:
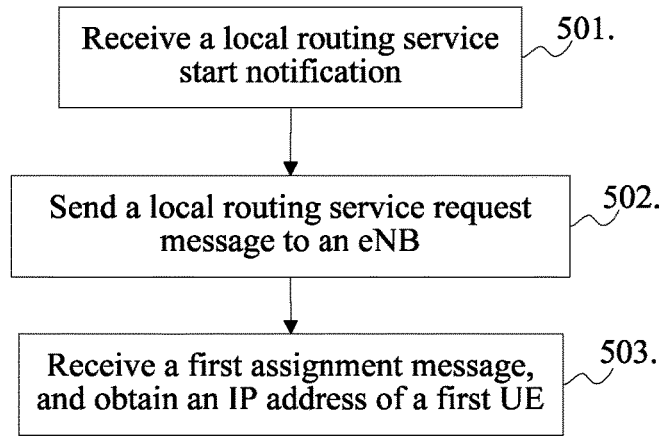
FIG. 5 is a flowchart of a local routing method implemented by a first terminal apparatus according to the present disclosure.

FIG. 4 shows yet another embodiment, including the following.

Step 402: An eNB initiates a local routing service start notification, where the local routing service start notification is used for notifying a user equipment UE that a local routing service is to be started; and the local routing service means that UE apparatuses within coverage of a same eNB can complete communication in a case of not performing data interaction with a core network.

Optionally, before step 402, according to step 201 in the embodiment shown in FIG. 2, the eNB may detect a situation of a connection to the core network, determine whether to start the local routing service, and when determining that the eNB cannot perform necessary data transmission with the core network, determine to start the local routing service.

In an embodiment, the eNB determines that a connection failure occurs between the eNB and the core network. For example, when detecting that a connection between the eNB and the core network is lost and signaling communication or data communication cannot be performed, the eNB determines to start the local routing service.

In another embodiment, when detecting that a data transmission bandwidth between the eNB and a core network node SGW is limited and is insufficient to support a data transmission requirement of a UE within a coverage area of the eNB, the eNB determines to start the local routing service.

It should be understood that, a condition under which the eNB determines to start the local routing service is not limited to the foregoing cases, and when the eNB determines a case in which it is necessary to start the local routing service, the eNB executes subsequent methods or steps in this solution.

Optionally, the local routing service start notification in step 402 may be, but is not limited to, a new message that carries a local routing service start identifier, or is a system broadcast message, carrying a local routing service start identifier, of the eNB. It should be understood that, the local routing service start notification may be a message in another form, which is not limited in the present disclosure.

Step 403. The eNB receives a local routing service request message sent by a first UE.

Optionally, the local routing service request message sent by the first UE and received by the eNB in step 403 may carry a local routing service request identifier, and the eNB determines, according to the local routing service request identifier, that the first UE supports the local routing service.

Optionally, the local routing service request identifier in step 403 may be, but is not limited to, any one or a combination of multiple of the following forms: a first aspect: a specific APN (Access Point Name), where optionally, an APN style dedicated for the local routing service is configured on the first UE: localroutingservice@chinamobile.com, and when the first UE expects to obtain the local routing service, the first UE sends, to the eNB, a request message carrying the APN; a second aspect: a specific network attach type (Attach Type), where optionally, 3 is taken as a value of the Attach Type to indicate that a UE expects to obtain a local routing service, and when the first UE expects to obtain the local routing service, the first UE sends, to the eNB, a request message carrying an attach type having a specific value; and a third aspect: ID information of the first UE, where the ID information of the first UE can be used for identifying whether the first UE has a capability of obtaining the local routing service, and optionally, a part of a UE ID is configured to have a specific format, for example, some bits in an encoding format of the UE ID have specific values, for example, the UE ID may be in the form of a mobile subscriber integrated services digital network number MSISDN (Mobile Subscriber International ISDN/PSTN number), in which 121 is taken for the first three bits, so that 121******** represents that the UE has a capability of obtaining the local routing service. It should be understood that, a UE ID is not limited to the form of an MSISDN, and may be ID information in a specific format of the first UE, or an identifier in another form.

Optionally, the message carrying the local routing service request identifier in step 403 can be used for initiating a network attach request message or initiating creation of a packet data network.

In an embodiment, in step 403, it is determined, according to the local routing service request message, that the local routing service request identifier indicates that the first UE has a capability of the local routing service. In another embodiment, it is determined that the local routing service request identifier indicates that the first UE requests obtaining of the local routing service. It should be understood that, the local routing service request identifier may indicate any message, and indicates that a UE requests establishment, with the eNB, of communication corresponding to the local routing service.

Step 404: The eNB sends the local routing service request message to a local mobility management entity MME on a network side.

Optionally, in step 405, the MME determines, according to the local routing service request message, that the first UE supports the local routing service.

Step 406: The local routing service request message is further used for requesting the local MME to send a first IP request message to a local packet data network gateway PGW on the network side. The MME sends the first IP request message to the local packet data network gateway PGW on the network side, where the first IP request message is used for requesting the local PGW to assign an IP address to the first UE.

In an embodiment, in step 406, the eNB may send, in a transparent transmission manner to the local MME, the local routing service request message sent by the first UE, and send the local routing service request message in step 401 to the local MME on the network side.

Step 407: The local MME sends the first IP request message to the local PGW, and after receiving the first IP request message, the local PGW assigns an IP address to the first UE, sets the IP address of the first UE in a second assignment message, and sends the second assignment message to the local MME.

Step 408: The local MME receives the second assignment message, obtains the IP address of the first UE according to the second assignment message, sets the IP address of the first UE in the first assignment message, and sends the first assignment message to the eNB.

Step 409: The eNB receives the first assignment message, and sends the first assignment message to the first UE.

In an embodiment, in step 409, the eNB receives the first assignment message in a transparent transmission manner, and sends the first assignment message to the first UE.

It should be understood that, correspondences between entity apparatuses on a network side and working methods involved in the embodiment shown in FIG. 4 are not limited, and various combinations, divisions and logical replacements of different apparatuses on the network side are required to be protected in the present disclosure. In addition, the modules are not limited to being located outside the eNB. Moreover, properties of the messages in this embodiment are all not limited, and may be newly created messages, or original messages, and may carry corresponding information for implementing the functions.

In some cases, the eNB cannot communicate with the core network; in the cases, when the first UE needs to keep communication with another UE within coverage of a local eNB, the eNB may start the local routing service, thereby ensuring local communication with a special demand or under a special condition. A specific implementation manner is that: The eNB receives the local routing service request message in a transparent transmission manner and sends the local routing service request message to the local MME apparatus, the local MME requests the IP address of the first UE from the local PGW apparatus, and a local PGW module determines the IP address of the first UE and delivers the IP address of the first UE to the local MME apparatus. The MME apparatus delivers the first assignment message to a local eNB, and the eNB receives the first assignment message in a transparent transmission manner and sends the first assignment message to the first UE, so as to start the local routing service.

It should be understood that, that the eNB cannot communicate with the core network is a specific example of a trigger condition, and when determining that the eNB needs to start the local routing service start notification and/or obtaining a notification of another device, the eNB may also start the local routing service; and in another case, a manner in which the eNB starts the local routing service is not limited in the present disclosure.

FIG. 500 shows yet another method embodiment, including the following.

Step 501: A first UE receives a local routing service start notification, where the local routing service start notification is used for determining to start a local routing service.

Optionally, the local routing service start notification in step 501 may be, but is not limited to, a new message that carries a local routing service start identifier, or is a system broadcast message, carrying a local routing service start identifier, of an eNB. It should be understood that, the local routing service start notification may be a message in another form, which is not limited in the present disclosure.

Step 502: After determining that the local routing service needs to be used, the first UE sends a local routing service request message to an eNB, where the local routing service request message is used for requesting the eNB to assign an IP address to the first UE.

Optionally, the local routing service request message sent by the first UE to the eNB in step 502 may carry a local routing service request identifier, and the eNB determines, according to the local routing service request identifier, that the first UE supports the local routing service.

Optionally, the local routing service request identifier in step 502 may be, but is not limited to, any one or a combination of multiple of the following forms: a first aspect: a specific APN (Access Point Name), where optionally, an APN style dedicated for the local routing service is configured on the first UE: localroutingservice@chinamobile.com, and when the first UE expects to obtain the local routing service, the first UE sends, to the eNB, a request message carrying the APN; a second aspect: a specific network attach type (Attach Type), where optionally, 3 is taken as a value of the Attach Type to indicate that a UE expects to obtain a local routing service, and when the first UE expects to obtain the local routing service, the first UE sends, to the eNB, a request message carrying an attach type having a specific value; and a third aspect: ID information of the first UE, where the ID information of the first UE can be used for identifying whether the first UE has a capability of obtaining the local routing service, and optionally, a part of a UE ID is configured to have a specific format, for example, some bits in an encoding format of the UE ID have specific values, for example, the UE ID may be in the form of a mobile subscriber integrated services digital network number MSISDN (Mobile Subscriber International ISDN/PSTN number), in which 121 is taken for the first three bits, so that 121******** represents that the UE has a capability of obtaining the local routing service. It should be understood that, a UE ID is not limited to the form of an MSISDN, and may be ID information in a specific format of the first UE, or an identifier in another form.

Optionally, the message carrying the local routing service request identifier in step 502 can be used for initiating a network attach request message or initiating creation of a packet data network.

In an embodiment, in step 502, it is determined, according to the local routing service request message, that the local routing service request identifier indicates that the first UE has a capability of the local routing service. In another embodiment, it is determined that the local routing service request identifier indicates that the first UE requests obtaining of the local routing service. It should be understood that, the local routing service request identifier may indicate any message, and indicates that a UE requests establishment, with the eNB, of communication corresponding to the local routing service.

Step 503: Receive a first assignment message, where the first assignment message includes the IP address of the first UE.

In some cases, when the first UE needs to keep communication with another UE within coverage of a local eNB, or an eNB determines that communication within coverage within which interaction with a switched network is not performed needs to be started, the eNB may start the local routing service, notify the user equipment UE that the local routing service is to be started, assign an IP address to the UE according to the received local routing service request of the UE, and initiate the local routing service, thereby ensuring local communication with a special demand or under a special condition.

FIG. 600 shows yet another method embodiment.

Step 601: An eNB initiates a local routing service start notification, where the local routing service start notification is used for notifying a first user equipment UE that a local routing service is to be started.

Optionally, the local routing service start notification in step 601 may be, but is not limited to, a new message that carries a local routing service start identifier, or is a system broadcast message, carrying a local routing service start identifier, of the eNB. It should be understood that, the local routing service start notification may be a message in another form, which is not limited in the present disclosure.

Before step 601, the eNB may detect a situation of a connection to a core network, determine whether to start the local routing service, and when determining that the eNB cannot perform necessary data transmission with the core network, determine to start the local routing service.

In an embodiment, the eNB determines that a connection failure occurs between the eNB and the core network. For example, when detecting that a connection between the eNB and the core network is lost and signaling communication or data communication cannot be performed, the eNB determines to start the local routing service.

Step 602: The first UE sends a local routing service request message to the eNB, where the local routing service request message is used for requesting the eNB to assign an IP address to the first UE.

Optionally, the local routing service request message may carry a local routing service request identifier, and the eNB determines, according to the local routing service request identifier, that the first UE supports the local routing service.

Optionally, the local routing service request identifier may be, but is not limited to, any one or a combination of multiple of the following forms: a first aspect: a specific APN (Access Point Name), where optionally, an APN style dedicated for the local routing service is configured on the first UE: localroutingservice@chinamobile.com, and when the first UE expects to obtain the local routing service, the first UE sends, to the eNB, a request message carrying the APN; a second aspect: a specific network attach type (Attach Type), where optionally, 3 is taken as a value of the Attach Type to indicate that a UE expects to obtain a local routing service, and when the first UE expects to obtain the local routing service, the first UE sends, to the eNB, a request message carrying an attach type having a specific value; and a third aspect: ID information of the first UE, where the ID information of the first UE can be used for identifying whether the first UE has a capability of obtaining the local routing service, and optionally, a part of a UE ID is configured to have a specific format, for example, some bits in an encoding format of the UE ID have specific values, for example, the UE ID may be in the form of a mobile subscriber integrated services digital network number MSISDN (Mobile Subscriber International ISDN/PSTN number), in which 121 is taken for the first three bits, so that 121******** represents that the UE has a capability of obtaining the local routing service. It should be understood that, a UE ID is not limited to the form of an MSISDN, and may be ID information in a specific format of the first UE, or an identifier in another form.

Optionally, the message carrying the local routing service request identifier can be used for initiating a network attach request message or initiating creation of a packet data network.

In an embodiment, it is determined, according to the local routing service request message, that the local routing service request identifier indicates that the first UE has a capability of the local routing service. In another embodiment, it is determined that the local routing service request identifier indicates that the first UE requests obtaining of the local routing service. It should be understood that, the local routing service request identifier may indicate any message, and indicates that a UE requests establishment, with the eNB, of communication corresponding to the local routing service.

Step 603: The eNB receives the local routing service request message, and determines, according to the local routing service message, that the first UE supports the local routing service.

Step 604: The eNB assigns an IP address to the first UE.

In an embodiment, the eNB includes a session management module and a registration and routing module, and the eNB sends a first IP request message to the session management module, where the first IP request message is used for requesting the session management module to request the registration and routing module to assign an IP address; after receiving the first IP request message, the session management module sends a second IP request message to the registration and routing module, so as to request assignment of an IP address to the first UE; and the registration and routing module assigns an IP address to the first UE and sends the IP address to the session management module; and the eNB receives the IP address assigned to the first UE, where the IP address assigned to the first UE is obtained from the session management module, and the eNB sets the IP address in a first assignment message.

It should be understood that, a bearer message for the IP address is not limited in the present disclosure, and the bearer message may be, but is not limited to, a newly created message, or an existing message used for communication between modules.

In another embodiment, the eNB sends the local routing service request message to a local mobility management entity MME on a network side, and the MME determines, according to the local routing service request message, that the first UE supports the local routing service, where the local routing service request message is further used for requesting the local MME to send a first IP request message to a local packet data network gateway PGW on the network side, and the first IP request message is used for requesting the local PGW to assign an IP address to the first UE; and after receiving the first IP request message, the local PGW assigns an IP address to the first UE, sets the IP address of the first UE in a second assignment message, and sends the second assignment message to the local MME. The local MME receives the second assignment message, obtains the IP address of the first UE, sets the IP address of the first UE in the first assignment message, and sends the first assignment message to the eNB. The eNB sends, in a transparent transmission manner to the local MME, the local routing service request message sent by the first UE, and the eNB sends the local routing service request message to the local MME on the network side. Similarly, the eNB receives the first assignment message in a transparent transmission manner.

Step 605: Send a first assignment message to the first UE, where the first assignment message includes the IP address assigned to the first UE.

Step 606: The first UE receives the first assignment message to obtain the IP address of the first UE, so as to complete starting of the local routing service.

In some cases, when the first UE needs to keep communication with another UE within coverage of a local eNB, or an eNB determines that communication within coverage within which interaction with a switched network is not performed needs to be started, the eNB may start the local routing service, notify the user equipment UE that the local routing service is to be started, assign an IP address to the UE according to the received local routing service request of the UE, and initiate the local routing service, thereby ensuring local communication with a special demand or under a special condition.

Figure 7:
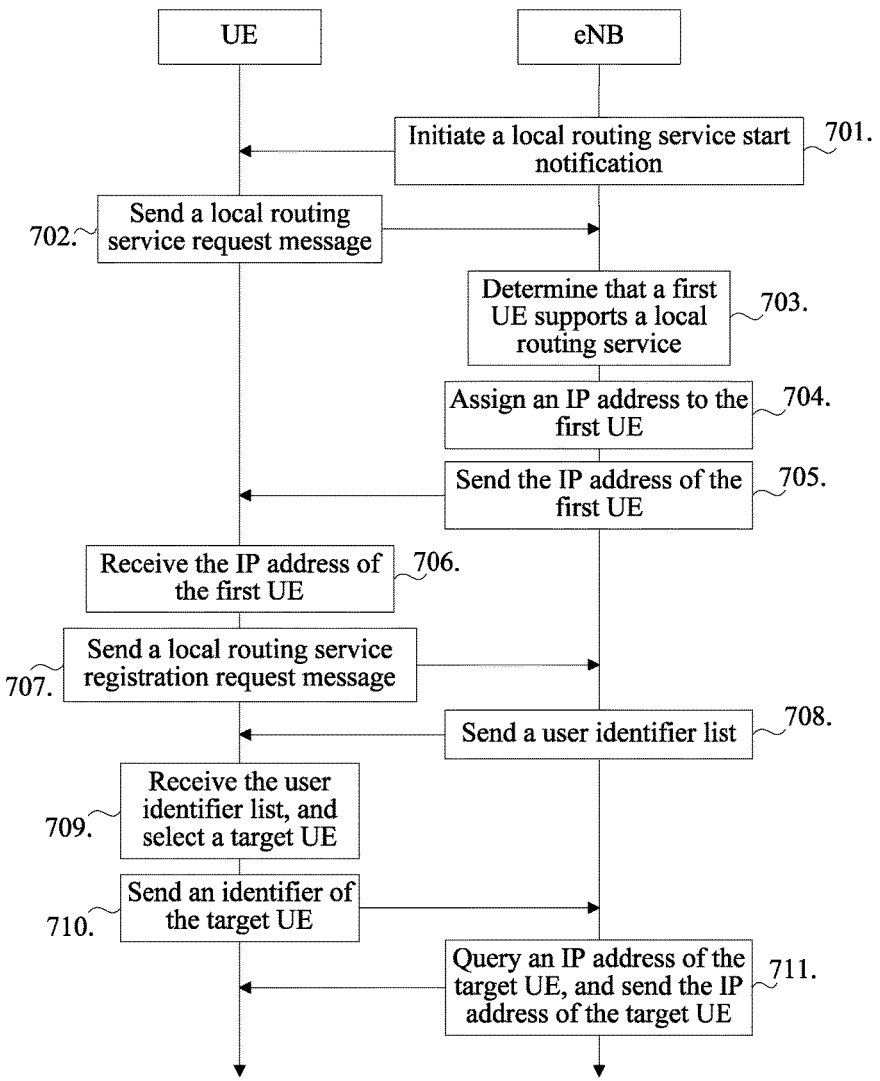
FIG. 7 is a flowchart of a local routing method implemented by a second base station apparatus or evolved base station apparatus and a terminal apparatus according to the present disclosure.

FIG. 7 shows yet another method embodiment, including the following.

Figure 6:
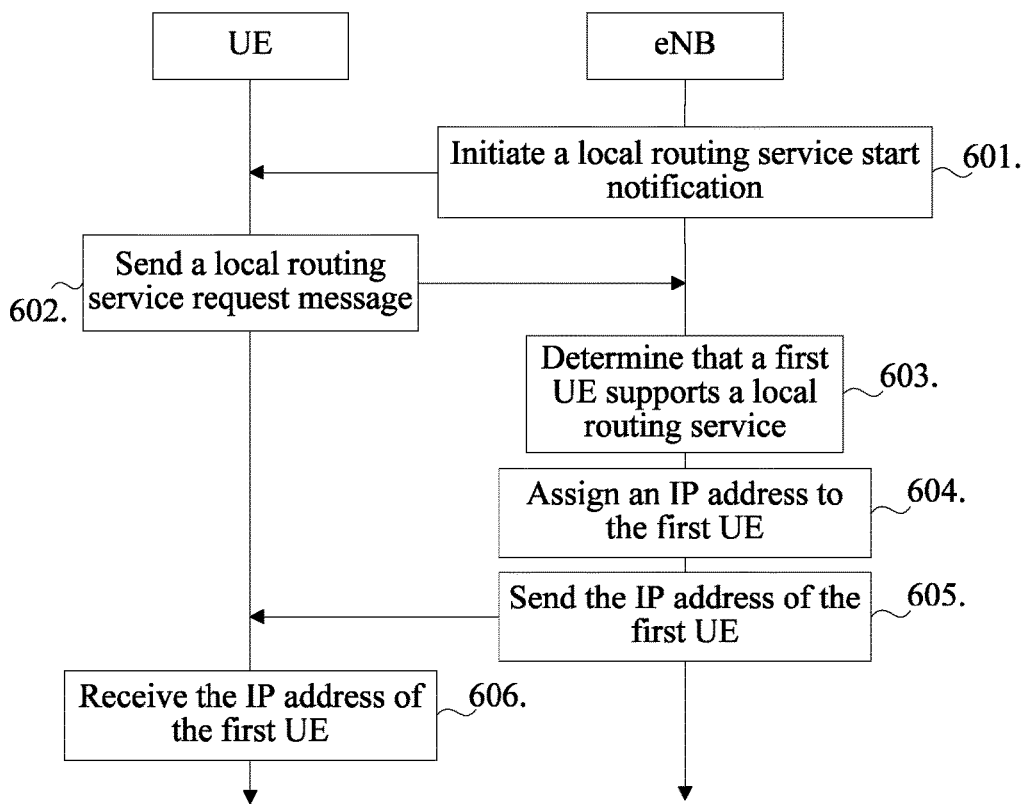
FIG. 6 is a flowchart of a local routing method implemented by a first base station apparatus or evolved base station apparatus and a terminal apparatus according to the present disclosure.

Step 701 to step 706 have already been described in the embodiment shown in FIG. 6, may all be replaced with the embodiments shown in FIG. 1 to FIG. 6, and are not described in detail herein again.

Step 707: The first UE sends a local routing service registration request message to the eNB, where the local routing service registration request message carries a user identifier of the first UE and an IP address of the first UE.

In an embodiment, the user identifier of the first UE and the IP address of the first UE are stored in a list of UE that support the local routing service.

Optionally, the local routing service registration request message is a user-defined application layer message.

Optionally, the user identifier is a user identifier of an application layer; or the user identifier is an MSISDN number; or the user identifier is a username allocated by a local routing service application.

Step 708: The eNB sends a user identifier list to the first UE, where the user identifier list includes an identifier of at least one UE that supports the local routing service.

In an embodiment, the eNB sends a first identifier request message to a local routing server on a network side, where the first identifier request message is used for requesting the local routing server to deliver the user identifier list; and the eNB receives a first identifier list message sent by the local routing server on the network side, where the first identifier list message includes the user identifier list, obtains the user identifier list from the first identifier list message, and sends the user identifier list to the first UE.

Further, in another embodiment, the first identifier request message may be a same message as the local routing service registration request message, that is, the eNB receives the local routing service request message in a transparent transmission manner, and directly sends the local routing service request message to the local routing server on the network side.

It should be understood that, the local routing server on the network side may be integrated, in the eNB, as a module.

It should be understood that, manners for sending the user identifier list from the local routing server to the eNB and sending the user identifier list from the eNB to the first UE are not limited in the present disclosure, and a same bearer message may be used, and for convenience, is named a first bearer message; and the eNB receives the first bearer message in a transparent transmission manner, and directly delivers the first bearer message. In addition, in the manners for sending the user identifier list from the local routing server to the eNB and sending the user identifier list from the eNB to the first UE, different bearer messages may also be used for sending.

Optionally, the eNB or the local routing server on the network side may screen, according to a rule, identifiers of all UEs that support the local routing service, to obtain a part of the user identifier list, and send the part of the user identifier list to the first UE.

Further, the rule may be to select a UE equipment that has a same packet identifier as the first UE and supports the local routing service.

Step 709: The first UE receives the user identifier list, and selects a target UE according to the user identifier list.

It should be understood that, a method for selecting the target UE from the user identifier list is not limited in the present disclosure; in different application scenarios, the target UE is selected in various manners: for example, a user may manually and directly select a target UE with which communication can be performed, or the first UE automatically performs selection according to the user identifier list; and automatic selection is performed in many manners, for example, according to signal strength of a selectable UE.

Step 710: The first UE sends an identifier of the target UE to the eNB, where the identifier of the target UE is used for requesting obtaining of an IP address of the target UE.

Step 711: The eNB receives the identifier of the target UE; and queries, by using the identifier of the target UE, a relationship between the user identifier list and a user IP address to obtain the IP address of the target UE, and sends the IP address of the target UE to the first UE.

It should be understood that, in step 708 and step 709, the identifier of the target UE may be directly sent to the eNB, or may be sent according to a bearer message, which is not limited in the present disclosure.

In still another embodiment, the eNB sends a first querying request message to the local routing server on the network side to request the local routing server to query the IP address of the target UE; and receives a first target IP message sent by the local routing server, where the first target IP message includes the IP address of the target UE, and the IP address of the target UE is obtained by the local routing server by querying the relationship between the UE identifier list and a user IP address.

Further, in another embodiment, the first querying request message may be the identifier of the target UE, that is, the eNB receives the identifier of the target UE in a transparent transmission manner, and directly sends the identifier of the target UE to the local routing server on the network side. Optionally, the first querying request message may also be a same message as a message that carries the identifier of the target UE.

It should be understood that, the local routing server on the network side may be integrated, in the eNB, as a module.

It should be understood that, manners for sending the IP address of the target UE from the local routing server to the eNB and sending the IP address of the target UE from the eNB to the first UE are not limited in the present disclosure, and a same bearer message may be used, and for convenience, is named a second bearer message; and the eNB receives the second bearer message in a transparent transmission manner, and directly delivers the second bearer message. In addition, different bearer messages may also be used.

In some cases, when the first UE needs to keep communication with another UE within coverage of a local eNB, or an eNB determines that communication within coverage within which interaction with a switched network is not performed needs to be started, the eNB may start the local routing service, notify the first user equipment UE that the local routing service is to be started, assign an IP address to the first UE according to the received local routing service request of the first UE, and initiate the local routing service. Further, the first UE initiates the local routing service registration request, and the eNB delivers the user identifier list to the first UE according to the registration request, where the list records all identifiers of all currently registered UEs or a part of user identifiers, which are obtained after the screening, of UEs. In addition, the identifier of the first UE may further be stored in a user list to update the user identifier list of the UE. After receiving the user list, the first UE selects the identifier of the target UE according to selection by a user or determining of the first UE or another trigger condition, and queries the IP address of the target UE from the eNB. After obtaining the IP address of the target UE, the first UE can initiate local communication.

Figure 8:
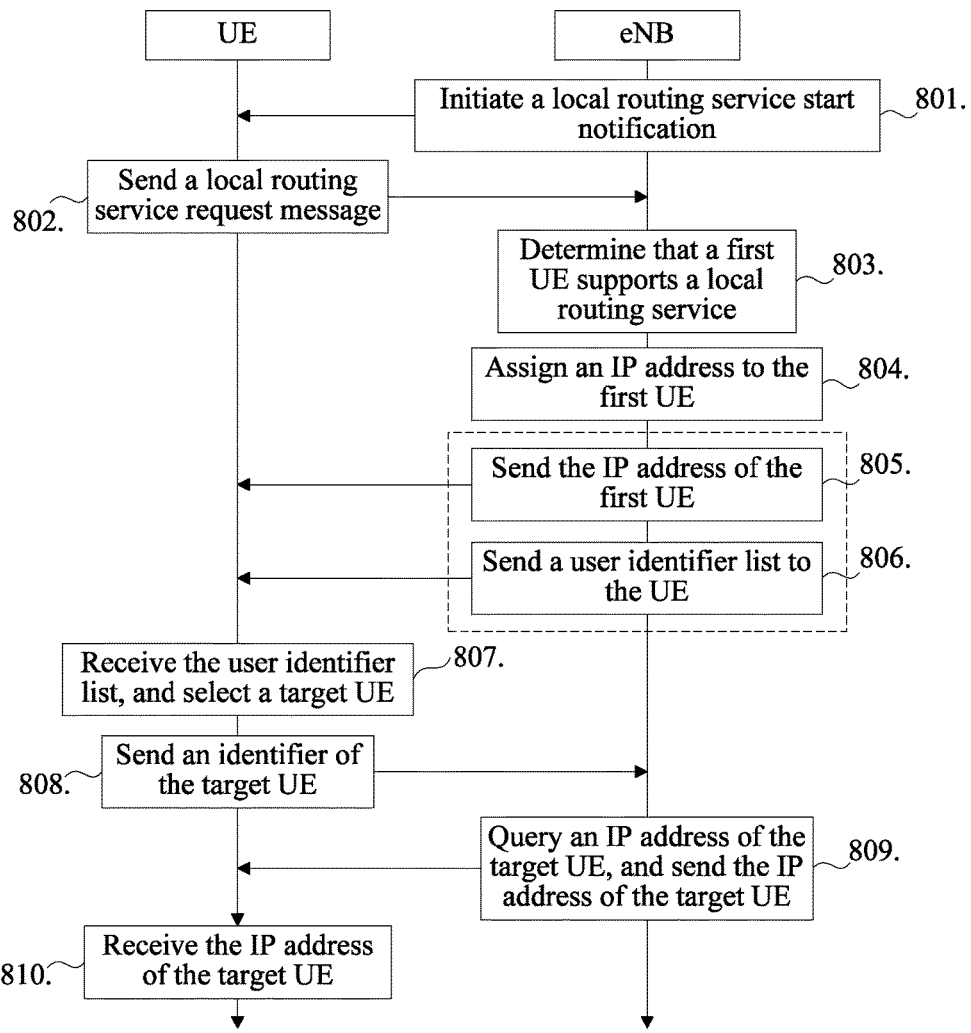
FIG. 8 is a flowchart of a local routing method implemented by a third base station apparatus or evolved base station apparatus and a terminal apparatus according to the present disclosure.

FIG. 8 shows yet another method embodiment, including the following.

Steps 801 to 805 have already been described in the embodiment shown in FIG. 8, may all be replaced by the embodiments shown in FIG. 1 to FIG. 6, and are not described in detail herein again.

Step 806: Send a user identifier list to the first UE, where the user identifier list includes an identifier of at least one UE that supports the local routing service.

In an embodiment, the eNB sends a second identifier request message to a session management module on a network side, where the second identifier request message is used for requesting the session management module to send a third identifier request message to a registration and routing module on the network side, and the third identifier request message is used for requesting the registration and routing module to deliver the user identifier list; and the eNB receives the user identifier list delivered by the session management module on the network side, where the user identifier list is sent by the registration and routing module to the session management module.

Optionally, content of the second identifier request message is included in the first IP request message, and the first IP request message is further used for requesting the session management module to request the registration and routing module to deliver the user identifier list.

Optionally, content of the third identifier request message is included in the second IP request message, and the second IP request message is further used for requesting the registration and routing module to deliver the user identifier list.

Optionally, the user identifier list may be included in the first IP assignment message.

Further, in another embodiment, the second identifier request message may be a same message as the local routing service registration request message, that is, the eNB receives the local routing service request message in a transparent transmission manner, and directly sends the local routing service request message to the session management module.

In still another embodiment, the eNB receives, in a transparent transmission manner, the first IP assignment message delivered by the session management module, and sends the first IP assignment message to the first UE.

Optionally, the user identifier list sent to the first UE may be sent by using a newly created message.

Optionally, the user identifier list is set in the first assignment message in step 605 shown in FIG. 6 (corresponding to step 805 in this embodiment), and is sent to the UE.

Step 807: The first UE receives the user identifier list, and selects a target UE according to the user identifier list.

Optionally, when the user list is set in the first assignment message, the user identifier list and the IP address that are included in the first assignment message are obtained by receiving the first assignment message.

It should be understood that, a method for selecting the target UE from the user identifier list is not limited in the present disclosure; in application scenarios, the target UE is selected in various manners: for example, a user may manually and directly select a target UE with which communication can be performed, or the first UE automatically performs selection according to the user identifier list; and automatic selection is performed in many manners, for example, according to signal strength.

Step 808: Send an identifier of the target UE to the eNB, where the identifier of the target UE is used for requesting obtaining of an IP address of the target UE.

Step 809: The eNB receives the identifier of the target UE; and queries, by using the identifier of the target UE, a relationship between the user identifier list and a user IP address to obtain the IP address of the target UE, and sends the IP address of the target UE to the first UE.

In an embodiment, the eNB sends a second querying request message to the session management module on the network side, where the second querying request message is used for requesting the session management module to send a third querying request message to the registration and routing module on the network side, and the third querying request message is used for requesting querying of the IP address of the target UE from the registration and routing module; and the eNB receives the IP address of the target UE delivered by the session management module on the network side, where the IP address of the UE is obtained by the registration and routing module by querying the relationship between the UE identifier list and a user IP address, and is delivered by the registration and routing module to the session management module.

Further, in another embodiment, the second querying request message may be the identifier of the target UE, that is, the eNB receives the identifier of the target UE in a transparent transmission manner, and directly sends the identifier of the target UE to the local routing server on the network side. In still another embodiment, the third querying request message may also be the identifier of the target UE, that is, the session management module receives the identifier of the target UE in a transparent transmission manner, and directly sends the identifier of the target UE to the registration and routing module.

It should be understood that, manners for sending the IP address of the target UE from the registration and routing module to the session management module, sending the IP address of the target UE from the session management module to the registration and routing module, and sending the IP address of the target UE from the eNB to the first UE are not limited in the present disclosure, and the three may use a same bearer message or may use different bearer messages.

Step 810: The first UE receives the IP address of the target UE delivered by the eNB.

In some cases, when the first UE needs to keep communication with another UE within coverage of a local eNB, or an eNB determines that communication within coverage within which interaction with a switched network is not performed needs to be started, the eNB may start the local routing service, notify the first user equipment UE that the local routing service is to be started, assign an IP address to the first UE according to the received local routing service request of the first UE, and deliver the user identifier list to the first UE according to the registration request. Further, the first UE initiates the local routing service registration request, and the eNB receives the local routing service registration request and delivers the user identifier list, where the list records all identifiers of all currently registered UEs or a part of user identifiers, which are obtained after the screening, of UEs. In addition, the identifier of the first UE may further be stored in a user list to update the user identifier list of the UE. After receiving the user list, the first UE selects the identifier of the target UE according to selection by a user or determining of the first UE or another trigger condition, and queries the IP address of the target UE from the eNB. After obtaining the IP address of the target UE, the first UE can initiate local communication.

It should be understood that, the session management module may be integrated, in the eNB, as a module, and the registration and routing module may be integrated, in the eNB, as a module. It should be particularly noted that the solution that is required to be protected in the present disclosure includes, but is not limited to, divisions and combinations of the modules, and replacements of the modules in position and time based on a logical order.

Figure 9:
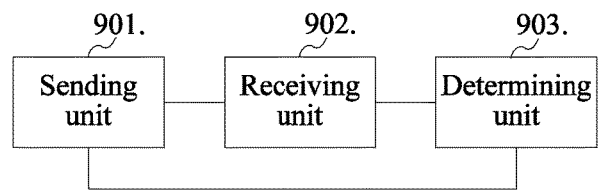
FIG. 9 is a schematic structural diagram of a first base station apparatus or evolved base station apparatus for implementing a local routing method according to the present disclosure.

FIG. 9 shows an eNB apparatus embodiment, including the following.

A sending unit 901 is configured to initiate a local routing service start notification, where the local routing service start notification is used for notifying a user equipment UE that a local routing service is to be started; and the local routing service means that UE apparatuses within coverage of a same eNB can complete communication in a case of not performing data interaction with a core network.

Optionally, the local routing service start notification may be, but is not limited to, a new message that carries a local routing service start identifier, or is a system broadcast message, carrying a local routing service start identifier, of an eNB. It should be understood that, the local routing service start notification may be a message in another form, which is not limited in the present disclosure.

A receiving unit 902 is configured to receive a local routing service request message sent by a first UE.

Optionally, the local routing service request message sent by the first UE and received by the eNB may carry a local routing service request identifier, and the eNB determines, according to the local routing service request identifier, that the first UE supports the local routing service.

Optionally, the local routing service request identifier may be, but is not limited to, any one or a combination of multiple of the following forms: a first aspect: a specific APN (Access Point Name), where optionally, an APN style dedicated for the local routing service is configured on the first UE: localroutingservice@chinamobile.com, and when the first UE expects to obtain the local routing service, the first UE sends, to the eNB, a request message carrying the APN; a second aspect: a specific network attach type (Attach Type), where optionally, 3 is taken as a value of the Attach Type to indicate that a UE expects to obtain a local routing service, and when the first UE expects to obtain the local routing service, the first UE sends, to the eNB, a request message carrying an attach type having a specific value; and a third aspect: ID information of the first UE, where the ID information of the first UE can be used for identifying whether the first UE has a capability of obtaining the local routing service, and optionally, a part of a UE ID is configured to have a specific format, for example, some bits in an encoding format of the UE ID have specific values, for example, the UE ID may be in the form of a mobile subscriber integrated services digital network number MSISDN (Mobile Subscriber International ISDN/PSTN number), in which 121 is taken for the first three bits, so that 121******** represents that the UE has a capability of obtaining the local routing service. It should be understood that, a UE ID is not limited to the form of an MSISDN, and may be ID information in a specific format of the first UE, or an identifier in another form.

Optionally, the message carrying the local routing service request identifier can be used for initiating a network attach request message or initiating creation of a packet data network PDN (Packet Data Network).

A determining unit 903 is configured to determine, according to the local routing service request message, that the first UE supports the local routing service, and assign an IP address to the first UE.

In an embodiment, it is determined, according to the local routing service request message, that the local routing service request identifier indicates that the first UE has a capability of the local routing service. In another embodiment, it is determined that the local routing service request identifier indicates that the first UE requests obtaining of the local routing service. It should be understood that, the local routing service request identifier may indicate any message, and indicates that the first UE supports establishment, with the eNB, of communication corresponding to the local routing service.

Correspondingly, for a UE that cannot read the local routing service start notification, when the eNB checks that a local routing service request identifier is not included in a local routing service request identifier that should be carried, or the eNB checks that a message that the UE should request starting of the local routing service in another manner is invalid, the UE still initiates, to the eNB, sending of an attach request to a common core network, or creation of a PDN connection request; and for the connection request, optionally, the eNB returns a failure message, so as to avoid a waste of subsequent signaling.

The sending unit 901 is further configured to send a first assignment message to the first UE, where the first assignment message includes the IP address assigned to the first UE.

In some cases, when the first UE needs to keep communication with another UE within coverage of a local eNB, or an eNB determines that communication within coverage within which interaction with a switched network is not performed needs to be started, the eNB may start the local routing service, notify the user equipment UE that the local routing service is to be started, assign an IP address to the UE according to the received local routing service request of the UE, and initiate the local routing service, thereby ensuring local communication with a special demand or under a special condition.

Figure 10:
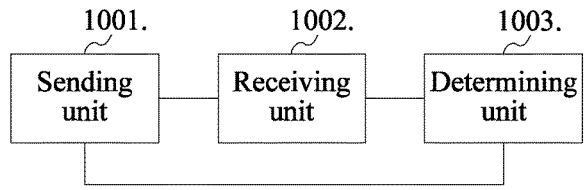
FIG. 10 is a schematic structural diagram of a second base station apparatus or evolved base station apparatus for implementing a local routing method according to the present disclosure.

FIG. 10 shows another base station apparatus embodiment. Before a sending unit 1001 initiates a local routing service start notification, a determining unit 1003 is configured to detect a situation of a connection to a core network, determine whether to start a local routing service, and when determining that an eNB cannot perform necessary data transmission with the core network, determine to start the local routing service.

In an embodiment, the determining unit 1003 determines that a connection failure occurs between the eNB and the core network. For example, when detecting that a connection between the eNB and the core network is lost and signaling communication or data communication cannot be performed, the eNB determines to start the local routing service.

In another embodiment, when detecting that a data transmission bandwidth between the eNB and a core network node SGW is limited and is insufficient to support a data transmission requirement of a UE within a coverage area of the eNB, the determining unit 1003 determines to start the local routing service.

It should be understood that, a condition under which the determining unit 1003 determines to start the local routing service is not limited to the foregoing cases, and when the eNB determines a case in which it is necessary to start the local routing service, the eNB executes subsequent methods or steps in this solution.

The sending unit 1001, a receiving unit 1002, the determining unit 1003, and implemented functions and steps have already been described in the embodiment shown in FIG. 9, and are not described in detail herein again.

In some cases, the eNB cannot communicate with the core network; in the cases, when the first UE needs to keep communication with another UE within coverage of a local eNB, the eNB may start the local routing service, thereby ensuring local communication with a special demand or under a special condition. It should be noted that, that the eNB cannot communicate with the core network is a specific example of a trigger condition, and when determining and/or obtaining a notification of another device, the eNB may also start the local routing service; and in another case, a manner in which the eNB starts the local routing service is not limited in the present disclosure.

Figure 11:
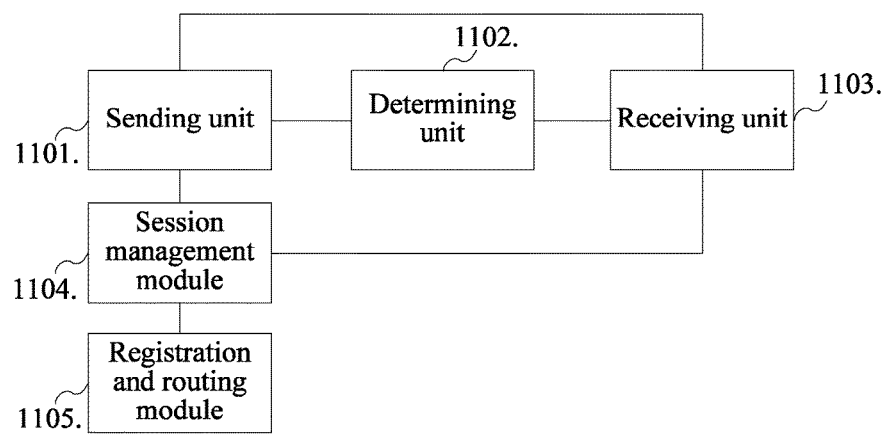
FIG. 11 is a schematic structural diagram of a third base station apparatus or evolved base station apparatus for implementing a local routing method according to the present disclosure.

FIG. 11 shows another base station embodiment, including the following.

A sending unit 1101 initiates a local routing service start notification, where the local routing service start notification is used for notifying a user equipment UE that a local routing service is to be started; and the local routing service means that UE apparatuses within coverage of a same eNB can complete communication in a case of not performing data interaction with a core network.

Optionally, the local routing service start notification may be, but is not limited to, a new message that carries a local routing service start identifier, or is a system broadcast message, carrying a local routing service start identifier, of an eNB. It should be understood that, the local routing service start notification may be a message in another form, which is not limited in the present disclosure.

Optionally, before the sending unit 1101 initiates the local routing service start notification, a determining unit 1102 is configured to detect a situation of a connection to the core network, determine whether to start the local routing service, and when determining that the eNB cannot perform necessary data transmission with the core network, determine to start the local routing service.

In an embodiment, the determining unit 1102 determines that a connection failure occurs between the eNB and the core network. For example, when detecting that a connection between the eNB and the core network is lost and signaling communication or data communication cannot be performed, the determining unit 1102 determines to start the local routing service.

In still another embodiment, when detecting that a data transmission bandwidth between the eNB and a core network node SGW is limited and is insufficient to support a data transmission requirement of a UE within a coverage area of the eNB, the determining unit 1102 determines to start the local routing service.

It should be understood that, a condition under which the determining unit 1102 determines to start the local routing service is not limited to the foregoing cases, and when the determining unit 1102 determines a case in which it is necessary to start the local routing service, the eNB executes subsequent methods or steps in this solution.

A receiving unit 1103 is configured to receive a local routing service request message sent by a first UE.

Optionally, the local routing service request message sent by the first UE and received by the eNB may carry a local routing service request identifier, and the receiving unit 1103 determines, according to the local routing service request identifier, that the first UE supports the local routing service.

Optionally, the local routing service request identifier may be, but is not limited to, any one or a combination of multiple of the following forms: a first aspect: a specific APN (Access Point Name), where optionally, an APN style dedicated for the local routing service is configured on the first UE: localroutingservice@chinamobile.com, and when the first UE expects to obtain the local routing service, the first UE sends, to the eNB, a request message carrying the APN; a second aspect: a specific network attach type (Attach Type), where optionally, 3 is taken as a value of the Attach Type to indicate that a UE expects to obtain a local routing service, and when the first UE expects to obtain the local routing service, the first UE sends, to the eNB, a request message carrying an attach type having a specific value; and a third aspect: ID information of the first UE, where the ID information of the first UE can be used for identifying whether the first UE has a capability of obtaining the local routing service, and optionally, a part of a UE ID is configured to have a specific format, for example, some bits in an encoding format of the UE ID have specific values, for example, the UE ID may be in the form of a mobile subscriber integrated services digital network number MSISDN (Mobile Subscriber International ISDN/PSTN number), in which 121 is taken for the first three bits, so that 121******** represents that the UE has a capability of obtaining the local routing service. It should be understood that, a UE ID is not limited to the form of an MSISDN, and may be ID information in a specific format of the first UE, or an identifier in another form.

Optionally, the message carrying the local routing service request identifier can be used for initiating a network attach request message or initiating creation of a packet data network.

In an embodiment, it is determined, according to the local routing service request message, that the local routing service request identifier indicates that the first UE has a capability of the local routing service. In another embodiment, it is determined that the local routing service request identifier indicates that the first UE requests obtaining of the local routing service. It should be understood that, the local routing service request identifier may indicate any message, and indicates that a UE requests establishment, with the eNB, of communication corresponding to the local routing service.

The determining unit 1102 is further configured to determine, according to the local routing service request message, that the first UE supports the local routing service.

The sending unit 1101 is further configured to send a first IP request message to a session management module 1104 of the eNB, where the first IP request message is used for requesting the session management module 1004 to request a registration and routing module 1105 of the eNB to assign an IP address.

The session management module 1104 receives the first IP request message, and sends a second IP request message to the registration and routing module 1105 according to the first IP request message, where the second IP request message is used for requesting assignment of an IP address to the first UE.

It should be understood that, a bearer message for the IP address is not limited in this embodiment, and the bearer message may be, but is not limited to, a newly created message, or an existing message used for the registration and routing module 1105 to communicate with the session management module 1104.

The registration and routing module 1105 receives the second IP request message, assigns an IP address to the first UE, and sends the IP address of the first UE to the receiving unit 1103.

It should be understood that, a bearer message for the IP address is not limited in this embodiment, and the bearer message may be, but is not limited to, a newly created message, or an existing message used for the session management module 1104 to communicate with the receiving unit 1103.

The sending unit 1101 is further configured to set the IP address in a first assignment message, and send the first assignment message to the first UE, where the first assignment message includes the IP address assigned to the first UE.

It should be understood that, correspondences between entity modules and entity units and working methods involved in the embodiment shown in FIG. 11 are not limited, and various combinations, divisions and logical replacements of different modules are required to be protected in the present disclosure. In addition, the entity modules and entity units are not limited to being located inside the eNB.

In some cases, the eNB cannot communicate with the core network; in the cases, when the first UE needs to keep communication with another UE within coverage of a local eNB, the eNB may start the local routing service, thereby ensuring local communication with a special demand or under a special condition. A specific implementation manner is that: A session management module and a registration and routing module are integrated inside the eNB, and after receiving the local routing service request message, the eNB assigns, through the session management module and the registration and routing module, an IP address to the first UE that sends the local routing service request message, so as to complete starting of the local routing service. It should be noted that, that the eNB cannot communicate with the core network is a specific example of a trigger condition, and when determining and/or obtaining a notification of another device, the eNB may also start the local routing service; and in another case, a manner in which the eNB starts the local routing service is not limited in the present disclosure.

Figure 12:
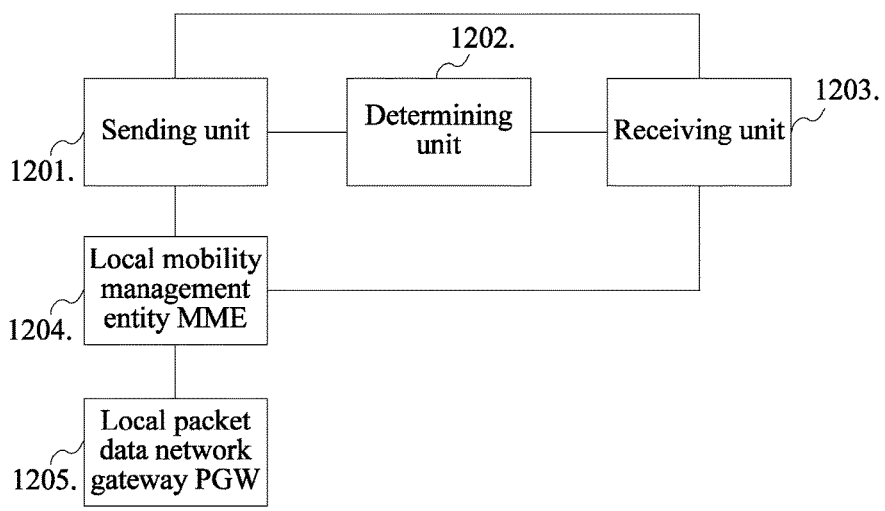
FIG. 12 is a schematic structural diagram of a fourth base station apparatus or evolved base station apparatus for implementing a local routing method according to the present disclosure.

FIG. 12 shows yet another base station apparatus embodiment of base station apparatus, including the following.

A sending unit 1201 is configured to initiate a local routing service start notification, where the local routing service start notification is used for notifying a user equipment UE that a local routing service is to be started; and the local routing service means that UE apparatuses within coverage of a same eNB can complete communication in a case of not performing data interaction with a core network.

Optionally, the local routing service start notification may be, but is not limited to, a new message that carries a local routing service start identifier, or is a system broadcast message, carrying a local routing service start identifier, of an eNB. It should be understood that, the local routing service start notification may be a message in another form, which is not limited in the present disclosure.

Optionally, before the sending unit 1201 initiates the local routing service start notification, a determining unit 1202 is configured to detect a situation of a connection to the core network, determine whether to start the local routing service, and when determining that the eNB cannot perform necessary data transmission with the core network, determine to start the local routing service.

In an embodiment, the determining unit 1202 determines that a connection failure occurs between the eNB and the core network. For example, when detecting that a connection between the eNB and the core network is lost and signaling communication or data communication cannot be performed, the determining unit 1202 determines to start the local routing service.

In another embodiment, when detecting that a data transmission bandwidth between the eNB and a core network node SGW is limited and is insufficient to support a data transmission requirement of a UE within a coverage area of the eNB, the determining unit 1202 determines to start the local routing service.

It should be understood that, a condition under which the determining unit 1202 determines to start the local routing service is not limited to the foregoing cases, and when the determining unit 1202 determines a case in which it is necessary to start the local routing service, the eNB executes subsequent methods or steps in this solution.

A receiving unit 1203 is configured to receive a local routing service request message sent by a first UE.

Optionally, the local routing service request message sent by the first UE and received by the eNB may carry a local routing service request identifier, and the receiving unit 1203 determines, according to the local routing service request identifier, that the first UE supports the local routing service.

Optionally, the local routing service request identifier may be, but is not limited to, any one or a combination of multiple of the following forms: a first aspect: a specific APN (Access Point Name), where optionally, an APN style dedicated for the local routing service is configured on the first UE: localroutingservice@chinamobile.com, and when the first UE expects to obtain the local routing service, the first UE sends, to the eNB, a request message carrying the APN; a second aspect: a specific network attach type (Attach Type), where optionally, 3 is taken as a value of the Attach Type to indicate that a UE expects to obtain a local routing service, and when the first UE expects to obtain the local routing service, the first UE sends, to the eNB, a request message carrying an attach type having a specific value; and a third aspect: ID information of the first UE, where the ID information of the first UE can be used for identifying whether the first UE has a capability of obtaining the local routing service, and optionally, a part of a UE ID is configured to have a specific format, for example, some bits in an encoding format of the UE ID have specific values, for example, the UE ID may be in the form of a mobile subscriber integrated services digital network number MSISDN (Mobile Subscriber International ISDN/PSTN number), in which 121 is taken for the first three bits, so that 121******** represents that the UE has a capability of obtaining the local routing service. It should be understood that, a UE ID is not limited to the form of an MSISDN, and may be ID information in a specific format of the first UE, or an identifier in another form.

Optionally, the message carrying the local routing service request identifier can be used for initiating a network attach request message or initiating creation of a packet data network.

In an embodiment, it is determined, according to the local routing service request message, that the local routing service request identifier indicates that the first UE has a capability of the local routing service. In another embodiment, it is determined that the local routing service request identifier indicates that the first UE requests obtaining of the local routing service. It should be understood that, the local routing service request identifier may indicate any message, and indicates that a UE requests establishment, with the eNB, of communication corresponding to the local routing service.

The sending unit 1201 is further configured to send the local routing service request message to a local mobility management entity MME device 1204 on a network side.

The local mobility management entity MME device 1204 determines, according to the local routing service request message, that the first UE supports the local routing service.

The local routing service request message is further used for requesting the local MME to send a first IP request message to a local packet data network gateway PGW device 1205 on the network side, where the first IP request message is used for requesting the local PGW to assign an IP address to the first UE.

In an embodiment, the eNB may send, in a transparent transmission manner to the local MME, the local routing service request message sent by the first UE, and send the local routing service request message to the local MME on the network side.

The local MME is further configured to send the first IP request message to the local PGW, and the local PGW is further configured to receive the first IP request message, assign an IP address to the first UE, set the IP address of the first UE in a second assignment message, and send the second assignment message to the local MME.

The local MME is further configured to receive the second assignment message, obtain the IP address of the first UE according to the second assignment message, set the IP address of the first UE in the first assignment message, and send the first assignment message to the eNB.

The receiving unit 1203 is further configured to receive the first assignment message, and the sending unit 1201 is further configured to send the first assignment message to the first UE.

In an embodiment, the eNB receives the first assignment message in a transparent transmission manner, and sends the first assignment message to the first UE.

It should be understood that, correspondences between entity apparatuses on a network side and working methods involved in the embodiment shown in FIG. 12 are not limited, and various combinations, divisions and logical replacements of different apparatuses on the network side are required to be protected in the present disclosure. In addition, the modules are not limited to being located outside the eNB. Moreover, properties of the messages in the embodiments are all not limited, and may be newly created messages, or original messages, or may carry corresponding information for implementing the functions.

In some cases, the eNB cannot communicate with the core network; in the cases, when the first UE needs to keep communication with another UE within coverage of a local eNB, the eNB may start the local routing service, thereby ensuring local communication with a special demand or under a special condition. A specific implementation manner is that: The eNB receives the local routing service request message in a transparent transmission manner and sends the local routing service request message to the local MME apparatus on the network side, the local MME on the network side requests the IP address of the first UE from the local PGW apparatus on the network side, and a local PGW module on the network side determines the IP address of the first UE and delivers the IP address of the first UE to the local MME apparatus. The MME apparatus delivers the first assignment message to the local eNB, and the eNB receives the first assignment message in a transparent transmission manner and sends the first assignment message to the first UE, so as to start the local routing service.

It should be understood that, that the eNB cannot communicate with the core network is a specific example of a trigger condition, and when determining that the eNB needs to start the local routing service start notification and/or obtaining a notification of another device, the eNB may also start the local routing service; and in another case, a manner in which the eNB starts the local routing service is not limited in the present disclosure.

Figure 13:
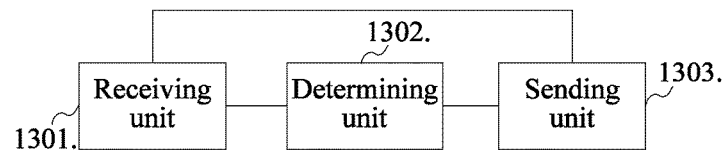
FIG. 13 is a schematic structural diagram of a first terminal apparatus for implementing a local routing method according to the present disclosure.

FIG. 13 shows another terminal apparatus embodiment, including the following.

A receiving unit 1301 is configured to receive a local routing service start notification, where the local routing service start notification is used for determining to start a local routing service.

Optionally, the local routing service start notification may be, but is not limited to, a new message that carries a local routing service start identifier, or is a system broadcast message, carrying a local routing service start identifier, of an eNB. It should be understood that, the local routing service start notification may be a message in another form, which is not limited in the present disclosure.

A determining unit 1302 is configured to determine, according to the local routing service start notification, that a first UE needs to use the local routing service.

A sending unit 1303 sends a local routing service request message to an eNB, where the local routing service request message is used for requesting the eNB to assign an IP address to the first UE.

Optionally, the local routing service request message sent by the first UE and received by the eNB may carry a local routing service request identifier, and the eNB determines, according to the local routing service request identifier, that the first UE supports the local routing service.

Optionally, the local routing service request identifier may be, but is not limited to, any one or a combination of multiple of the following forms: a first aspect: a specific APN (Access Point Name), where optionally, an APN style dedicated for the local routing service is configured on the first UE: localroutingservice@chinamobile.com, and when the first UE expects to obtain the local routing service, the first UE sends, to the eNB, a request message carrying the APN; a second aspect: a specific network attach type (Attach Type), where optionally, 3 is taken as a value of the Attach Type to indicate that a UE expects to obtain a local routing service, and when the first UE expects to obtain the local routing service, the first UE sends, to the eNB, a request message carrying an attach type having a specific value; and a third aspect: ID information of the first UE, where the ID information of the first UE can be used for identifying whether the first UE has a capability of obtaining the local routing service, and optionally, a part of a UE ID is configured to have a specific format, for example, some bits in an encoding format of the UE ID have specific values, for example, the UE ID may be in the form of a mobile subscriber integrated services digital network number MSISDN (Mobile Subscriber International ISDN/PSTN number), in which 121 is taken for the first three bits, so that 121******** represents that the UE has a capability of obtaining the local routing service. It should be understood that, a UE ID is not limited to the form of an MSISDN, and may be ID information in a specific format of the first UE, or an identifier in another form.

Optionally, the message carrying the local routing service request identifier can be used for initiating a network attach request message or initiating creation of a packet data network.

In an embodiment, it is determined, according to the local routing service request message, that the local routing service request identifier indicates that the first UE has a capability of the local routing service. In another embodiment, it is determined that the local routing service request identifier indicates that the first UE requests obtaining of the local routing service. It should be understood that, the local routing service request identifier may indicate any message, and indicates that a UE requests establishment, with the eNB, of communication corresponding to the local routing service.

The receiving unit 1301 is further configured to receive a first assignment message, where the first assignment message includes an IP address of the first UE.

In some cases, when the first UE needs to keep communication with another UE within coverage of a local eNB, or an eNB determines that communication within coverage within which interaction with a switched network is not performed needs to be started, the eNB may start the local routing service, notify the user equipment UE that the local routing service is to be started, assign an IP address to the UE according to the received local routing service request of the UE, and initiate the local routing service, thereby ensuring local communication with a special demand or under a special condition.

Figure 14:
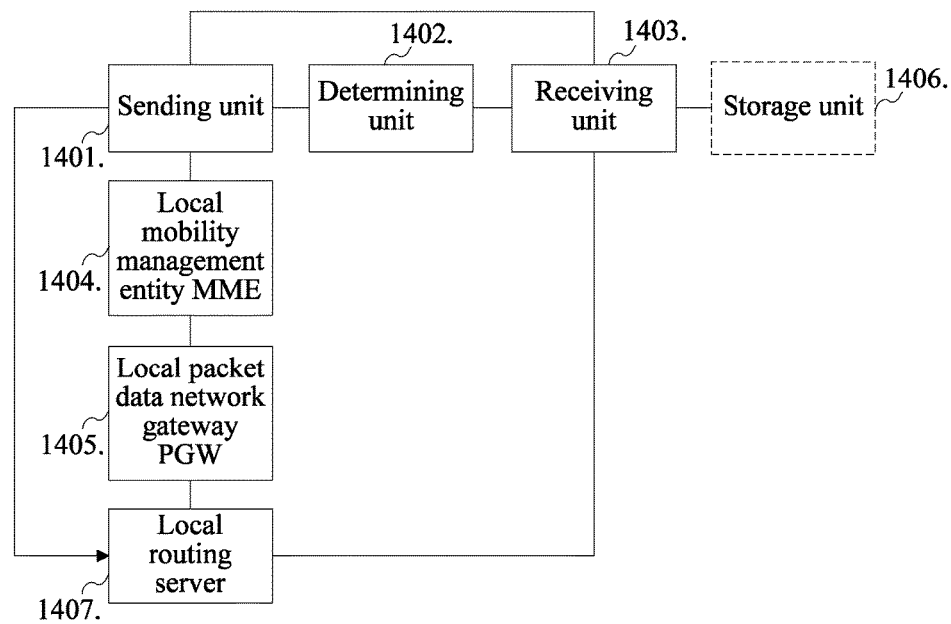
FIG. 14 is a schematic structural diagram of a fifth base station apparatus or evolved base station apparatus for implementing a local routing method according to the present disclosure.

FIG. 14 shows yet another base station apparatus, including the following.

A sending unit 1401 is configured to initiate a local routing service start notification, where the local routing service start notification is used for notifying a first user equipment UE that a local routing service is to be started.

Optionally, the local routing service start notification may be, but is not limited to, a new message that carries a local routing service start identifier, or is a system broadcast message, carrying a local routing service start identifier, of an eNB. It should be understood that, the local routing service start notification may be a message in another form, which is not limited in the present disclosure.

Optionally, before the sending unit 1401 initiates the local routing service start notification, a determining unit 1402, the eNB, may detect a situation of a connection to a core network, determine whether to start the local routing service, and when determining that the eNB cannot perform necessary data transmission with the core network, determine to start the local routing service.

In an embodiment, the eNB determines that a connection failure occurs between the eNB and the core network. For example, when detecting that a connection between the eNB and the core network is lost and signaling communication or data communication cannot be performed, the eNB determines to start the local routing service.

A receiving unit 1403 is configured to receive a local routing service request message sent by the first UE to the eNB, where the local routing service request message is used for requesting the eNB to assign an IP address to the first UE.

Optionally, the local routing service request message may carry a local routing service request identifier, and the eNB determines, according to the local routing service request identifier, that the first UE supports the local routing service.

Optionally, the local routing service request identifier may be, but is not limited to, any one or a combination of multiple of the following forms: a first aspect: a specific APN (Access Point Name), where optionally, an APN style dedicated for the local routing service is configured on the first UE: localroutingservice@chinamobile.com, and when the first UE expects to obtain the local routing service, the first UE sends, to the eNB, a request message carrying the APN; a second aspect: a specific network attach type (Attach Type), where optionally, 3 is taken as a value of the Attach Type to indicate that a UE expects to obtain a local routing service, and when the first UE expects to obtain the local routing service, the first UE sends, to the eNB, a request message carrying an attach type having a specific value; and a third aspect: ID information of the first UE, where the ID information of the first UE can be used for identifying whether the first UE has a capability of obtaining the local routing service, and optionally, a part of a UE ID is configured to have a specific format, for example, some bits in an encoding format of the UE ID have specific values, for example, the UE ID may be in the form of a mobile subscriber integrated services digital network number MSISDN (Mobile Subscriber International ISDN/PSTN number), in which 121 is taken for the first three bits, so that 121******** represents that the UE has a capability of obtaining the local routing service. It should be understood that, a UE ID is not limited to the form of an MSISDN, and may be ID information in a specific format of the first UE, or an identifier in another form. Optionally, the message carrying the local routing service request identifier can be used for initiating a network attach request message or initiating creation of a packet data network.

In an embodiment, it is determined, according to the local routing service request message, that the local routing service request identifier indicates that the first UE has a capability of the local routing service. In another embodiment, it is determined that the local routing service request identifier indicates that the first UE requests obtaining of the local routing service. It should be understood that, the local routing service request identifier may indicate any message, and indicates that a UE requests establishment, with the eNB, of communication corresponding to the local routing service.

The sending unit 1401 is further configured to send the local routing service request message to a local mobility management entity MME device 1404 on a network side.

The local mobility management entity MME device 1404 determines, according to the local routing service request message, that the first UE supports the local routing service.

The local routing service request message is further used for requesting the local MME to send a first IP request message to a local packet data network gateway PGW device 1405 on the network side, where the first IP request message is used for requesting the local PGW to assign an IP address to the first UE.

In an embodiment, the eNB may send, in a transparent transmission manner to the local MME, the local routing service request message sent by the first UE, i.e., the local MME is on the network side.

The local MME is further configured to send the first IP request message to the local PGW, and the local PGW is further configured to receive the first IP request message, assign an IP address to the first UE, set the IP address of the first UE in a second assignment message, and send the second assignment message to the local MME.

The local MME is further configured to receive the second assignment message, obtain the IP address of the first UE according to the second assignment message, set the IP address of the first UE in a first assignment message, and send the first assignment message to the eNB.

The receiving unit 1403 is further configured to receive the first assignment message, and the sending unit 1401 is further configured to send the first assignment message to the first UE.

In an embodiment, the eNB receives the first assignment message in a transparent transmission manner, and sends the first assignment message to the first UE.

The receiving unit 1403 is further configured to receive a local routing service registration request message sent by the first UE to the eNB, where the local routing service registration request message carries a user identifier of the first UE and the IP address of the first UE.

Optionally, a storage unit 1406 is configured to store the user identifier of the first UE and the IP address of the first UE in a list of UE that support the local routing service.

Optionally, the local routing service registration request message is a user-defined application layer message.

Optionally, the user identifier is a user identifier of an application layer; or the user identifier is an MSISDN number; or the user identifier is a username allocated by a local routing service application.

The sending unit 1401 is further configured to send a user identifier list to the first UE, where the user identifier list includes an identifier of at least one UE that supports the local routing service.

In an embodiment, the sending unit sends a first identifier request message to a local routing server 1407, where the first identifier request message is used for requesting the local routing server to deliver the user identifier list; and the receiving unit 1403 receives a first identifier list message sent by the local routing server on the network side, where the first identifier list message includes the user identifier list, obtains the user identifier list from the first identifier list message, and sends the user identifier list to the first UE.

Further, in another embodiment, the first identifier request message may be a same message as the local routing service registration request message, that is, the eNB receives the local routing service request message in a transparent transmission manner, and directly sends the local routing service request message to the local routing server on the network side.

It should be understood that, the local routing server on the network side may be integrated, in the eNB, as a module.

It should be understood that, manners for sending the user identifier list from the local routing server to the eNB and sending the user identifier list from the eNB to the first UE are not limited in the present disclosure, and a same bearer message may be used, and for convenience, is named a first bearer message; and the eNB receives the first bearer message in a transparent transmission manner, and directly delivers the first bearer message. In addition, in manners for sending the user identifier list from the local routing server to the eNB and sending the user identifier list from the eNB to the first UE, different bearer messages may also be used for sending.

Optionally, the local routing server 1407 is further configured to screen, according to a rule, identifiers of all UEs that support the local routing service, to obtain a part of the user identifier list, and send the part of the user identifier list to the first UE.

Further, the rule may be to select a UE equipment that has a same packet identifier as the first UE and supports the local routing service.

The receiving unit 1403 is further configured to receive an identifier of a target UE, and the sending unit 1401 is further configured to query, according to the identifier of the target UE, a relationship between the user identifier list and a user IP address to obtain an IP address of the target UE, and send the IP address of the target UE to the first UE.

In an embodiment, the sending unit 1401 sends a first querying request message to the local routing server 1407 on the network side to request the local routing server to query the IP address of the target UE; and the receiving unit 1403 receives a first target IP message sent by the local routing server, where the first target IP message includes the IP address of the target UE, and the IP address of the target UE is obtained by the local routing server 1407 by querying the relationship between the UE identifier list and a user IP address. The sending unit 1401 receives the IP address of the target UE and sends the IP address of the target UE to the first UE.

Further, in another embodiment, the first querying request message may be the identifier of the target UE, that is, the eNB receives the identifier of the target UE through the receiving unit in a transparent transmission manner, and directly sends the identifier of the target UE to the local routing server on the network side through the sending unit.

It should be understood that, the local routing server 1407 on the network side may be integrated, in the eNB, as a module.

It should be understood that, manners for sending the IP address of the target UE from the local routing server 1407 to the eNB and sending the IP address of the target UE from the eNB to the first UE are not limited in the present disclosure, and a same bearer message may be used, and for convenience, is named a second bearer message; and the eNB receives the second bearer message in a transparent transmission manner, and directly delivers the second bearer message. In addition, different bearer messages may also be used to send the IP address of the target UE to the eNB and send the IP address of the target UE to the first UE from the eNB.

In some cases, when the first UE needs to keep communication with another UE within coverage of a local eNB, or an eNB determines that communication within coverage within which interaction with a switched network is not performed needs to be started, the eNB may start the local routing service, notify the first user equipment UE that the local routing service is to be started, assign an IP address to the first UE according to the received local routing service request of the first UE, and initiate the local routing service. Further, the first UE initiates the local routing service registration request, and the eNB delivers the user identifier list to the first UE according to the registration request, where the list records all identifiers of all currently registered UEs or a part of user identifiers, which are obtained after the screening, of UEs. In addition, the identifier of the first UE may further be stored in a user list to update the user identifier list of the UE. After receiving the user list, the first UE selects the identifier of the target UE according to selection by a user or determining of the first UE or another trigger condition, and queries the IP address of the target UE from the eNB. After obtaining the IP address of the target UE, the first UE can initiate local communication.

It should be understood that, correspondences between entity apparatuses on a network side and working methods involved in the embodiment shown in FIG. 14 are not limited, and various combinations, divisions and logical replacements of different apparatuses on the network side are required to be protected in the present disclosure. In addition, the modules are not limited to being located outside the eNB. In an embodiment, the modules may be integrated inside the eNB.

In some cases, the eNB cannot communicate with the core network; in the cases, when the first UE needs to keep communication with another UE within coverage of a local eNB, the eNB may start the local routing service, thereby ensuring local communication with a special demand or under a special condition. A specific implementation manner is that: The eNB receives the local routing service request message in a transparent transmission manner and sends the local routing service request message to the local MME apparatus, the local MME requests the IP address of the first UE from the local PGW apparatus, and a local PGW module determines the IP address of the first UE and delivers the IP address of the first UE to the local MME apparatus. The MME apparatus delivers the first assignment message to a local eNB, and the eNB receives the first assignment message in a transparent transmission manner and sends the first assignment message to the first UE, so as to start the local routing service.

It should be understood that, that the eNB cannot communicate with the core network is a specific example of a trigger condition, and when determining that the eNB needs to start the local routing service start notification and/or obtaining a notification of another device, the eNB may also start the local routing service; and in another case, a manner in which the eNB starts the local routing service is not limited in the present disclosure.

Figure 15:
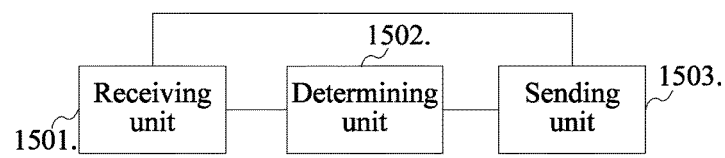
FIG. 15 is a schematic structural diagram of a second terminal apparatus for implementing a local routing method according to the present disclosure.

FIG. 15 shows another terminal apparatus embodiment, including the following.

A receiving unit 1501 is configured to receive a local routing service start notification, where the local routing service start notification is used for determining to start a local routing service.

Optionally, the local routing service start notification may be, but is not limited to, a new message that carries a local routing service start identifier, or is a system broadcast message, carrying a local routing service start identifier, of an eNB. It should be understood that, the local routing service start notification may be a message in another form, which is not limited in the present disclosure.

A determining unit 1502 is configured to determine, according to the local routing service start notification, that a first UE needs to use the local routing service.

A sending unit 1503 sends a local routing service request message to an eNB, where the local routing service request message is used for requesting the eNB to assign an IP address to the first UE.

Optionally, the local routing service request message sent by the first UE and received by the eNB may carry a local routing service request identifier, and the eNB determines, according to the local routing service request identifier, that the first UE supports the local routing service.

Optionally, the local routing service request identifier may be, but is not limited to, any one or a combination of multiple of the following forms: a first aspect: a specific APN (Access Point Name), where optionally, an APN style dedicated for the local routing service is configured on the first UE: localroutingservice@chinamobile.com, and when the first UE expects to obtain the local routing service, the first UE sends, to the eNB, a request message carrying the APN; a second aspect: a specific network attach type (Attach Type), where optionally, 3 is taken as a value of the Attach Type to indicate that a UE expects to obtain a local routing service; and when the first UE expects to obtain the local routing service, the first UE sends, to the eNB, a request message carrying an attach type having a specific value; and a third aspect: ID information of the first UE, where the ID information of the first UE can be used for identifying whether the first UE has a capability of obtaining the local routing service, and optionally, a part of a UE ID is configured to have a specific format, for example, some bits in an encoding format of the UE ID have specific values, for example, the UE ID may be in the form of a mobile subscriber integrated services digital network number MSISDN (Mobile Subscriber International ISDN/PSTN number), in which 121 is taken for the first three bits, so that 121******** represents that the UE has a capability of obtaining the local routing service. It should be understood that, a UE ID is not limited to the form of an MSISDN, and may be ID information in a specific format of the first UE, or an identifier in another form.

Optionally, the message carrying the local routing service request identifier can be used for initiating a network attach request message or initiating creation of a packet data network.

In an embodiment, it is determined, according to the local routing service request message, that the local routing service request identifier indicates that the first UE has a capability of the local routing service. In another embodiment, it is determined that the local routing service request identifier indicates that the first UE requests obtaining of the local routing service. It should be understood that, the local routing service request identifier may indicate any message, and indicates that a UE requests establishment, with the eNB, of communication corresponding to the local routing service.

The receiving unit 1501 is further configured to receive a first assignment message, where the first assignment message includes the IP address of the first UE.

The sending unit 1503 is further configured to send a local routing service registration request message to the eNB, where the local routing service registration request message carries a user identifier of the first UE and the IP address of the first UE.

Optionally, the local routing service registration request message is a user-defined application layer message.

Optionally, the user identifier is a user identifier of an application layer; or the user identifier is an MSISDN number; or the user identifier is a username allocated by a local routing service application.

The receiving unit 1501 is further configured to receive a user identifier list, where the user identifier list includes an identifier of at least one UE that supports the local routing service.

The determining unit 1502 is further configured to select a target UE according to the user identifier list.

It should be understood that, a method for selecting the target UE from the user identifier list is not limited in the present disclosure; in application scenarios, the target UE is selected in various manners: for example, a user may manually and directly select a target UE with which communication can be performed, or the first UE automatically performs selection according to the user identifier list; and automatic selection is performed in many manners, for example, according to signal strength of a selectable UE.

The sending unit 1503 is further configured to send an identifier of the target UE to the eNB, where the identifier of the target UE is used for requesting obtaining of an IP address of the target UE.

The receiving unit 1501 is further configured to receive the IP address of the target UE. The first UE initiates communication with the target UE according to the IP address of the target.

In some cases, when the first UE needs to keep communication with another UE within coverage of a local eNB, or an eNB determines that communication within coverage within which interaction with a switched network is not performed needs to be started, the eNB may start the local routing service, notify the first user equipment UE that the local routing service is to be started, assign an IP address to the first UE according to the received local routing service request of the first UE, and initiate the local routing service. Further, the first UE initiates the local routing service registration request, and the eNB delivers the user identifier list to the first UE according to the registration request, where the list records all identifiers of all currently registered UEs or a part of user identifiers, which are obtained after the screening, of UEs. In addition, the identifier of the first UE may further be stored in a user list to update the user identifier list of the UE. After receiving the user list, the first UE selects the identifier of the target UE according to selection by a user or determining of the first UE or another trigger condition, and queries the IP address of the target UE from the eNB. After obtaining the IP address of the target UE, the first UE can initiate local communication.

Figure 16:
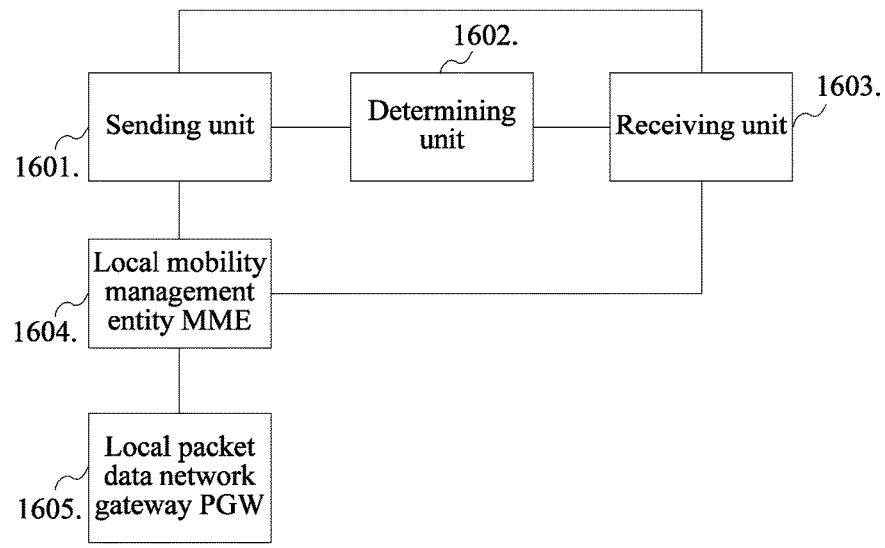
FIG. 16 is a schematic structural diagram of a sixth base station apparatus or evolved base station apparatus for implementing a local routing method according to the present disclosure.

FIG. 16 shows yet another base station apparatus embodiment, including the following.

A sending unit 1601 is configured to initiate a local routing service start notification, where the local routing service start notification is used for notifying a first user equipment UE that a local routing service is to be started.

Optionally, the local routing service start notification may be, but is not limited to, a new message that carries a local routing service start identifier, or is a system broadcast message, carrying a local routing service start identifier, of an eNB. It should be understood that, the local routing service start notification may be a message in another form, which is not limited in the present disclosure.

Optionally, before the sending unit 1601 initiates the local routing service start notification, a determining unit 1602 of the eNB, may detect a situation of a connection to a core network, determine whether to start the local routing service, and when determining that the eNB cannot perform necessary data transmission with the core network, determine to start the local routing service.

In an embodiment, the eNB determines that a connection failure occurs between the eNB and the core network. For example, when detecting that a connection between the eNB and the core network is lost and signaling communication or data communication cannot be performed, the eNB determines to start the local routing service.

A receiving unit 1603 is configured to receive a local routing service request message sent by the first UE to the eNB, where the local routing service request message is used for requesting the eNB to assign an IP address to the first UE.

Optionally, the local routing service request message may carry a local routing service request identifier, and the eNB determines, according to the local routing service request identifier, that the first UE supports the local routing service.

Optionally, the local routing service request identifier may be, but is not limited to, any one or a combination of multiple of the following forms: a first aspect: a specific APN (Access Point Name), where optionally, an APN style dedicated for the local routing service is configured on the first UE: localroutingservice@chinamobile.com, and when the first UE expects to obtain the local routing service, the first UE sends, to the eNB, a request message carrying the APN; a second aspect: a specific network attach type (Attach Type), where optionally, 3 is taken as a value of the Attach Type to indicate that a UE expects to obtain a local routing service, and when the first UE expects to obtain the local routing service, the first UE sends, to the eNB, a request message carrying an attach type having a specific value; and a third aspect: ID information of the first UE, where the ID information of the first UE can be used for identifying whether the first UE has a capability of obtaining the local routing service, and optionally, a part of a UE ID is configured to have a specific format, for example, some bits in an encoding format of the UE ID have specific values, for example, the UE ID may be in the form of a mobile subscriber integrated services digital network number MSISDN (Mobile Subscriber International ISDN/PSTN number), in which 121 is taken for the first three bits, so that 121******** represents that the UE has a capability of obtaining the local routing service. It should be understood that, a UE ID is not limited to the form of an MSISDN, and may be ID information in a specific format of the first UE, or an identifier in another form. Optionally, the message carrying the local routing service request identifier can be used for initiating a network attach request message or initiating creation of a packet data network.

In an embodiment, it is determined, according to the local routing service request message, that the local routing service request identifier indicates that the first UE has a capability of the local routing service. In another embodiment, it is determined that the local routing service request identifier indicates that the first UE requests obtaining of the local routing service. It should be understood that, the local routing service request identifier may indicate any message, and indicates that a UE requests establishment, with the eNB, of communication corresponding to the local routing service.

The sending unit 1601 is further configured to send the local routing service request message to a local mobility management entity MME device 1604 on a network side.

The local mobility management entity MME device 1604 determines, according to the local routing service request message, that the first UE supports the local routing service.

The local routing service request message is further used for requesting the local MME to send a first IP request message to a local packet data network gateway PGW device 1605 on the network side, where the first IP request message is used for requesting the local PGW to assign an IP address to the first UE.

In an embodiment, the eNB may send, in a transparent transmission manner to the local MME apparatus, the local routing service request message sent by the first UE, and send the local routing service request message to the local MME apparatus on the network side.

The local MME apparatus is further configured to send the first IP request message to the local PGW apparatus, and the local PGW apparatus is further configured to receive the first IP request message, assign an IP address to the first UE, set the IP address of the first UE in a second assignment message, and send the second assignment message to the local MME apparatus. The local PGW apparatus is further configured to send a user identifier list to the local MME apparatus, where the user identifier list includes an identifier of at least one UE that supports the local routing service.

In an embodiment, the user identifier list may be set in the second assignment message and sent to the local MME apparatus.

Optionally, the local PGW device 1605 is further configured to screen, according to a rule, identifiers of all UEs that support the local routing service, to obtain a part of the user identifier list, and send the part of the user identifier list to the first UE.

Further, the rule may be to select a UE equipment that has a same packet identifier as the first UE and supports the local routing service.

The local MME is further configured to receive the second assignment message and the user identifier list. Correspondingly, when the user identifier list is set in the second assignment message, the local MME may receive, but not limited to, only the second assignment message including the IP address of the first UE and the user identifier list. The local MME is further configured to obtain the IP address of the first UE according to the second assignment message. The local MME is further configured to obtain the user identifier list, where when the user identifier list is set in the second assignment message, the user identifier list is obtained according to the second assignment message.

The local MME is further configured to set the IP address of the first UE in a first assignment message, and send the first assignment message to the eNB. The MME is further configured to send the user identifier list to the eNB apparatus.

Optionally, the user identifier list may be set in the first assignment message and sent to the eNB apparatus.

The receiving unit 1603 is further configured to receive the first assignment message and the user identifier list. Correspondingly, when the user identifier list is set in the first assignment message, the receiving unit may receive, but not limited to, only the first assignment message, where the first assignment message includes the IP address of the first UE and the user identifier list. The receiving unit is further configured to obtain the IP address of the first UE according to the first assignment message. The receiving unit is further configured to obtain the user identifier list, where when the user identifier list is set in the first assignment message, the user identifier list is obtained according to the first assignment message.

The sending unit 1601 is further configured to send the IP address of the first UE to the first UE; and the sending unit 1601 is further configured to send the user identifier list to the first UE.

In an embodiment, when the first assignment message includes the IP address of the first UE and the user identifier list, the sending unit 1601 receives the first assignment message in a transparent transmission manner, and sends the first assignment message to the first UE.

The receiving unit 1603 is further configured to receive an identifier of a target UE sent by the first UE, where the identifier of the target UE is used for requesting obtaining of an IP address of the target UE; and specifically, by using the identifier of the target UE, a relationship between the user identifier list and a user IP address is queries to obtain the IP address of the target UE, and the IP address of the target UE is sent to the first UE.

In an embodiment, the sending unit 1601 sends a second querying request message to the local MME 1604 on the network side, where the second querying request message is used for requesting the local MME to send a third querying request message to the local PGW 1605 on the network side, where the third querying request message is used for requesting the local PGW to query the IP address of the target UE, and the eNB receives the IP address of the target UE delivered by the local MME on the network side, where the IP address of the UE is obtained by the local PGW by querying the relationship between the UE identifier list and a user IP address, and is delivered by the local PGW to the local MME.

Further, in another embodiment, the second querying request message may be the identifier of the target UE, that is, the eNB receives the identifier of the target UE in a transparent transmission manner, and directly sends the identifier of the target UE to the local MME on the network side. In still another embodiment, the third querying request message may also be the identifier of the target UE, that is, the local MME receives the identifier of the target UE in a transparent transmission manner, and directly sends the identifier of the target UE to the local PGW.

It should be understood that, manners for sending the IP address of the target UE from the local PGW to the local MME, sending the IP address of the target UE from the local MME to the local PGW, and sending the IP address of the target UE from the eNB to the first UE are not limited in the present disclosure; and the three may use a same bearer message, or may use different bearer messages.

In some cases, when the first UE needs to keep communication with another UE within coverage of a local eNB, or an eNB determines that communication within coverage within which interaction with a switched network is not performed needs to be started, the eNB may start the local routing service, notify the first user equipment UE that the local routing service is to be started, assign an IP address to the first UE according to the received local routing service request of the first UE, and deliver the user identifier list to the first UE according to the registration request. Further, the first UE initiates the local routing service registration request, and the eNB receives the local routing service registration request and delivers the user identifier list, where the list records all identifiers of all currently registered UEs or a part of user identifiers, which are obtained after the screening, of UEs. In addition, the identifier of the first UE may further be stored in a user list to update the user identifier list of the UE. After receiving the user list, the first UE selects the identifier of the target UE according to selection by a user or determining of the first UE or another trigger condition, and queries the IP address of the target UE from the eNB. After obtaining the IP address of the target UE, the first UE can initiate local communication.

It should be understood that, the local MME may be integrated, in the eNB, as a module, and the local PGW may be integrated, in the eNB, as a module. It should be particularly noted that the solution that is required to be protected in the present disclosure includes, but is not limited to, divisions and combinations of the modules, and replacements of the modules in position and time based on a logical order.

Figure 17:
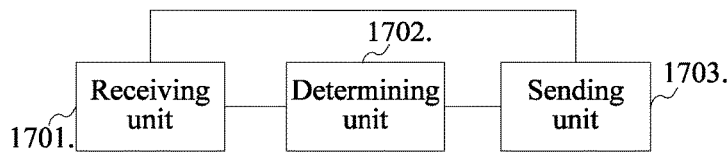
FIG. 17 is a schematic structural diagram of a third terminal apparatus for implementing a local routing method according to the present disclosure.

FIG. 17 shows still another terminal apparatus embodiment, including the following.

A receiving unit 1701 is configured to receive a local routing service start notification, where the local routing service start notification is used for determining to start a local routing service.

Optionally, the local routing service start notification may be, but is not limited to, a new message that carries a local routing service start identifier, or is a system broadcast message, carrying a local routing service start identifier, of an eNB. It should be understood that, the local routing service start notification may be a message in another form, which is not limited in the present disclosure.

A determining unit 1702 is configured to determine, according to the local routing service start notification, that a first UE needs to use the local routing service.

A sending unit 1703 sends a local routing service request message to an eNB, where the local routing service request message is used for requesting the eNB to assign an IP address to the first UE.

Optionally, the local routing service request message sent by the first UE and received by the eNB may carry a local routing service request identifier, and the eNB determines, according to the local routing service request identifier, that the first UE supports the local routing service.

Optionally, the local routing service request identifier may be, but is not limited to, any one or a combination of multiple of the following forms: a first aspect: a specific APN (Access Point Name), where optionally, an APN style dedicated for the local routing service is configured on the first UE: localroutingservice@chinamobile.com, and when the first UE expects to obtain the local routing service, the first UE sends, to the eNB, a request message carrying the APN; a second aspect: a specific network attach type (Attach Type), where optionally, 3 is taken as a value of the Attach Type to indicate that a UE expects to obtain a local routing service, and when the first UE expects to obtain the local routing service, the first UE sends, to the eNB, a request message carrying an attach type having a specific value; and a third aspect: ID information of the first UE, where the ID information of the first UE can be used for identifying whether the first UE has a capability of obtaining the local routing service, and optionally, a part of a UE ID is configured to have a specific format, for example, some bits in an encoding format of the UE ID have specific values, for example, the UE ID may be in the form of a mobile subscriber integrated services digital network number MSISDN (Mobile Subscriber International ISDN/PSTN number), in which 121 is taken for the first three bits, so that 121******** represents that the UE has a capability of obtaining the local routing service. It should be understood that, a UE ID is not limited to the form of an MSISDN, and may be ID information in a specific format of the first UE, or an identifier in another form.

Optionally, the message carrying the local routing service request identifier can be used for initiating a network attach request message or initiating creation of a packet data network.

In an embodiment, it is determined, according to the local routing service request message, that the local routing service request identifier indicates that the first UE has a capability of the local routing service. In another embodiment, it is determined that the local routing service request identifier indicates that the first UE requests obtaining of the local routing service. It should be understood that, the local routing service request identifier may indicate any message, and indicates that the first UE requests establishment, with the eNB, of communication corresponding to the local routing service.

The receiving unit 1701 is further configured to receive a first assignment message, where the first assignment message includes the IP address of the first UE. The receiving unit 1701 is further configured to receive a user identifier list.

In an embodiment, the first assignment message further includes the user identifier list, and the receiving unit receives the first assignment message, and obtains the IP address of the first UE and the user identifier list from the first assignment message.

The user identifier list includes an identifier of at least one UE that supports the local routing service, and the list records all identifiers of all currently registered UEs or a part of user identifiers, which are obtained after the screening, of UEs.

Optionally, the user identifier list may be obtained by screening, according to a rule, identifiers of all UEs that support the local routing service, or may be a part of the user identifier list, and the part of the user identifier list is sent to the first UE.

Optionally, the user identifier is a user identifier of an application layer; or the user identifier is an MSISDN number; or the user identifier is a username allocated by a local routing service application.

The determining unit 1702 is further configured to select a target UE according to the user identifier list.

It should be understood that, a method for selecting the target UE from the user identifier list is not limited in the present disclosure; in application scenarios, the target UE is selected in various manners: for example, a user may manually and directly select a target UE with which communication can be performed, or the first UE automatically performs selection according to the user identifier list; and automatic selection is performed in many manners, for example, according to signal strength of a selectable UE.

The sending unit 1703 is further configured to send an identifier of the target UE to the eNB, where the identifier of the target UE is used for requesting obtaining of an IP address of the target UE.

The receiving unit 1701 is further configured to receive the IP address of the target UE. The first UE initiates communication with the target UE according to the IP address of the target.

Figure 18:
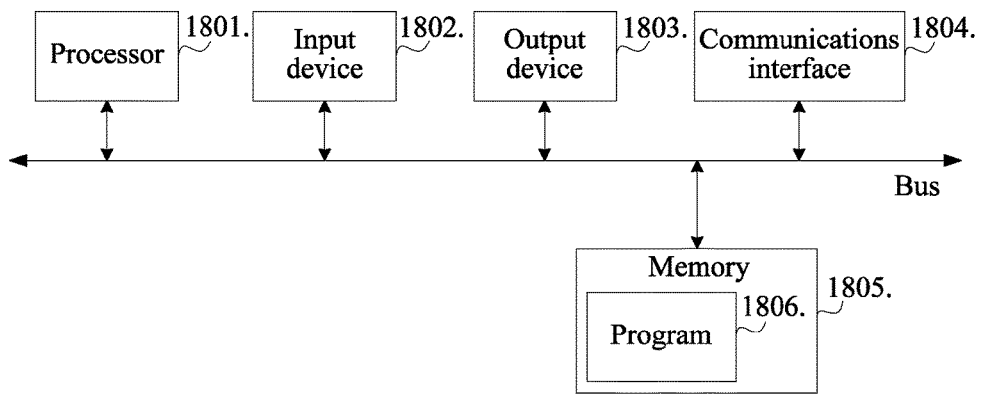
FIG. 18 is a schematic structural diagram of another terminal apparatus or base station apparatus for implementing a local routing method according to the present disclosure.

FIG. 18 shows a structure of a general computer system for the foregoing apparatus.

The computer system may be a processor-based computer, such as a general personal computer (PC) or a portable device such as a tablet computer or a smart phone.

More specifically, the foregoing computer system may include a bus, a processor 1801, an input device 1802, an output device 1803, a communications interface 1804, and a memory 1805. The processor 1801, the input device 1802, the output device 1803, the communications interface 1804, and the memory 1805 are connected to each other through the bus.

The bus may include a path, through which information is transferred between components in the computer system.

The processor 1801 may be a general processor, for example, a general central processing unit (CPU), a network processor (NP for short) or a microprocessor, or may be an application-specific integrated circuit (ASIC) or one or more integrated circuits configured to control program execution of the solutions in the present disclosure, or may be a digital signal processor (DSP), an application-specific integrated circuit (ASIC), a field-programmable gate array (FPGA), or another programmable logic device, a discrete gate, a transistor logic device, or a discrete hardware component.

The memory 1805 stores a program for executing the technical solutions in the present disclosure, and may further store an operating system and other application programs. Specifically, the program may include program code, and the program code includes a computer operation instruction. More specifically, the memory 1805 may be a read-only memory (ROM), a static storage device of another type that can store static information and an instruction, a random access memory (RAM), a dynamic storage device of another type that can store information and an instruction, a magnetic disk memory or the like.

The input device 1802 may include an apparatus for receiving data and information input by a user, for example, a keyboard, a mouse, a camera, a scanner, a light pen, a speech input apparatus or a touchscreen.

The output device 1803 may include an apparatus that allows output of information to a user, for example, a display screen, a printer, or a loudspeaker.

The communications interface 1804 may include a type of apparatus that uses any transceiver, so as to communicate with other devices or communications networks such as the Ethernet, a radio access network (RAN), and a wireless local area network (WLAN).

The processor 1801 executes the program stored in the memory 1805 to implement the local routing method provided in any one of the embodiments and any one of the apparatuses in the embodiments.

According to the descriptions of the foregoing embodiments, a person skilled in the art may clearly understand that the present disclosure may be implemented by hardware, firmware or a combination thereof. When the present disclosure is implemented by software, the foregoing functions may be stored in a computer-readable medium or transmitted as one or more instructions or code in the computer-readable medium. The computer-readable medium includes a computer storage medium and a communications medium, where the communications medium includes any medium that is convenient for transferring a computer program from one place to another. The storage medium may be any available medium that can be accessed by a computer. The following provides an example but does not impose a limitation: The computer-readable medium may include a RAM, a ROM, an EEPROM, a CD-ROM, or another optical disc storage, or disk storage medium, or another magnetic storage device, or any other medium that can carry or store expected program code in a form of an instruction or a data structure and can be accessed by a computer. In addition, any connection can be appropriately used as a computer-readable medium. For example, if software is transmitted from a website, a server, or another remote source by using a coaxial cable, an optical fiber/cable, a twisted pair, a digital subscriber line (DSL) or a wireless technology such as infrared ray, radio, or microwave, the coaxial cable, the optical fiber/cable, the twisted pair, the DSL or the wireless technology such as infrared ray, radio, or microwave are included in the definitions of mediums to which they belong. For example, a disk and a disc used in the present disclosure includes a compact disc (CD), a laser disc, an optical disc, a digital versatile disc (DVD), a floppy disk, and a Blu-ray disc, where the disk generally copies data magnetically, and the disc copies data optically by using lasers. The foregoing combination should also fall within the protection scope of the computer-readable medium.

In summary, the foregoing descriptions are merely exemplary embodiments of the technical solutions in the present disclosure, but are not intended to limit the protection scope of the present disclosure.

What is claimed is:

1. A method, comprising:
   detecting, by an evolved base station (eNB) that covers a local network, a situation of a lack of connection or an impaired connection to a core network;
   in response to detecting the situation, determining, by the eNB, to start a local routing service that, once implemented, enables a communication to occur within the local network, between a first user equipment (UE) and a second UE, and without interaction with the core network, wherein the first UE and the second UE are in the local network covered by the eNB;
   initiating, by the eNB, a local routing service start notification, wherein the local routing service start notification is used for notifying the first UE that the eNB starts the local routing service;
   receiving, by the eNB, a local routing service request message sent by a first UE;
   determining, by the eNB, according to the local routing service request message, that the first UE supports the local routing service;
   assigning, by the eNB, an internet protocol (IP) address to the first UE; and
   sending, by the eNB, a first assignment message to the first UE, wherein the first assignment message comprises the IP address assigned to the first UE;
   wherein the IP address assigned to the first UE is used for identifying the first UE in the communication that is with the second UE and that occurs inside the local network.

2. The method according to claim 1, wherein assigning the IP address to the first UE comprises:
   sending a first IP request message to a session management module of the eNB, wherein the first IP request message is used for requesting the session management module to send a second IP request message to a registration and routing module of the eNB, and the second IP request message is used for requesting the registration and routing module to assign an IP address to the first UE; and
   receiving the IP address assigned to the first UE, wherein the IP address assigned to the first UE is obtained from the session management module, and the session management module obtains the IP address according to the registration and routing module.

3. The method according to claim 1, wherein the determining, according to the local routing service request message, that the first UE supports the local routing service, and the assigning an IP address to the first UE comprises:
   sending, by the eNB, the local routing service request message to a mobility management entity (MME) in the core network;
   determining, by the MME, according to the local routing service request message, that the first UE supports the local routing service, wherein the local routing service request message is further used for requesting the MME to send a first IP request message to a packet data network gateway (PGW) in the core network, and the first IP request message is used for requesting the PGW to assign an IP address to the first UE;
   receiving, by the eNB, the first assignment message from the MME, wherein the first assignment message comprises the IP address of the first UE, and the IP address of the first UE is determined by the PGW;
   receiving, by the MME, a second assignment message from the PGW, wherein the second assignment message comprises the IP address of the first UE; and
   determining, by the MME, the first assignment message according to the second assignment message.

4. The method according to claim 1, wherein:
   the local routing service request message carries a local routing service request identifier; and
   the eNB determines, according to the local routing service request identifier, that the first UE supports the local routing service.

5. The method according to claim 4, wherein the determining that the first UE supports the local routing service comprises at least one of:
   determining that the local routing service request identifier indicates that the first UE has a capability of the local routing service; or
   determining that the local routing service request identifier indicates that the first UE requests obtaining of the local routing service.

6. The method according to claim 4, wherein the local routing service request identifier is at least one of a specific access point name (APN), a specific network attach type, or an ID information in a specific format of the first UE.

7. A method, comprising:
   initiating, by an evolved base station (eNB), a local routing service start notification to a plurality of user equipment (UEs), wherein the local routing service start notification is used for notifying that the eNB starts a local routing service;
   receiving, by the eNB, a local routing service request message sent by a first UE of the plurality of UEs;
   determining, according to the local routing service request message, that the first UE supports the local routing service;
   assigning an internet protocol (IP) address to the first UE;
   sending a first assignment message to the first UE, wherein the first assignment message comprises the IP address assigned to the first UE;
   sending a user identifier list to the first UE, wherein the user identifier list comprises an identifier of a second UE that also supports the local routing service;
   receiving an identifier of a target UE sent by the first UE, wherein the identifier of the target UE is an identifier of the second UE in the user identifier list;
   querying, by using the identifier of the target UE, a relationship between the user identifier list and a user IP address to obtain an IP address of the target UE; and
   sending the IP address of the target UE to the first UE;
   wherein the IP address assigned to the target UE, and the IP address assigned to the first UE, are used by the eNB when providing the local routing service to the target UE and the first UE.

8. The method according to claim 7, wherein sending the user identifier list to the first UE comprises:
   sending a second identifier request message to a session management module on a network side, wherein the second identifier request message is used for requesting the session management module to send a third identifier request message to a registration and routing module on the network side, and the third identifier request message is used for requesting the registration and routing module to deliver the user identifier list;
   receiving, the user identifier list delivered by the session management module on the network side, wherein the user identifier list is sent by the registration and routing module to the session management module; and
   sending the user identifier list to the first UE.

9. The method according to claim 7, further comprising:
setting the IP address of the first UE and the user identifier list in a single message; and
sending the single message to the first UE.

10. The method according to claim 7, further comprising:
receiving a local routing service registration request message, wherein the local routing service registration request message carries an identifier of the first UE and the assigned IP address that is obtained;
wherein sending the user identifier list to the first UE comprises sending the user identifier list to the first UE in response to receiving the local routing service registration request message from the first UE.

11. The method according to claim 10, wherein sending the user identifier list to the first UE comprises:
sending a first identifier request message to a local routing server on a network side, wherein the first identifier request message is used for requesting the local routing server to deliver the user identifier list;
receiving a first identifier list message sent by the local routing server on the network side, wherein the first identifier list message includes the user identifier list;
obtaining the user identifier list from the first identifier list message; and
sending the user identifier list to the first UE.

12. The method according to claim 10, wherein querying, by using the identifier of the target UE, the relationship between the user identifier list and the user IP address comprises:
sending a first query request message to a local routing server on a network side to request the local routing server to query the IP address of the target UE; and
receiving a first target IP message sent by the local routing server, wherein the first target IP message comprises the IP address of the target UE, and the IP address of the target UE is obtained by the local routing server by querying the relationship between the user identifier list and a user IP address.

13. The method according to claim 10, further comprising:
screening, according to a rule, identifiers of those UEs that also support the local routing service out of the plurality of UEs, to obtain a part of the user identifier list; and
sending the part of the user identifier list to the first UE.

14. The method according to claim 13, wherein:
the rule is to select a UE identifier that has a same packet identifier as the first UE and supports the local routing service.

15. An evolved base station (eNB), comprising:
a processor; and
a non-transitory computer-readable storage medium storing a program to be executed by the processor, the program including instructions for:
detecting a situation of a lack of connection or an impaired connection by a local network to a core network outside of the local network, wherein the local network is a network covered by the eNB;
in response to detecting the situation, determining to start a local routing service that, once implemented, enables a communication to occur within the local network, between a first user equipment (UE) and a second UE, and without interaction with the core network, wherein the first UE and the second UE are in the local network covered by the eNB;
initiating a local routing service start notification, wherein the local routing service start notification is used for notifying the first UE that the eNB starts the local routing service;
receiving a local routing service request message sent by the first UE;
determining, according to the local routing service request message, that the first UE supports the local routing service;
assigning an internet protocol (IP) address to the first UE; and
sending a first assignment message to the first UE, wherein the first assignment message comprises the IP address assigned to the first UE:
wherein the IP address assigned to the first UE is used for identifying the first UE in the communication that is with the second UE and that occurs inside the local network.

16. The eNB according to claim 15, wherein the non-transitory computer-readable storage medium further stores a plurality of modules that interact with the program when the program is executed;
wherein the plurality of modules comprise a session management module, and a registration and routing module; and
wherein the instructions for assigning an IP address to the first UE comprise instructions for:
sending a first IP request message to the session management module, wherein the first IP request message is used for requesting the session management module to send a second IP request message to the registration and routing module, and the second IP request message is used for requesting the registration and routing module to assign an IP address to the first UE; and
receiving the IP address assigned to the first UE, wherein the IP address assigned to the first UE is obtained from the session management module, and the session management module obtains the IP address according to the registration and routing module.

17. The eNB according to claim 15, wherein the instructions for determining, according to the local routing service request message, that the first UE supports the local routing service comprise instructions for:
sending the local routing service request message to a mobility management entity (MME), wherein the MME determines, according to the local routing service request message, that the first UE supports the local routing service, wherein the local routing service request message is further used for requesting the MME to send a first IP request message to a packet data network gateway (PGW), and the first IP request message is used for requesting the PGW to assign an IP address to the first UE; and
wherein instructions for assigning the IP address to the first UE comprise instructions for:
receiving the first assignment message from the MME, wherein the first assignment message comprises the IP address of the first UE, and the IP address of the first UE is determined by the MME, after the MME has received a second assignment message from the PGW, wherein the second assignment message comprises the IP address of the first UE; and the MME has determined the first assignment message according to the second assignment message.

18. The eNB according to claim 15, wherein:
the local routing service request message carries a local routing service request identifier that identifies whether the first UE supports the local routing service.

19. The eNB according to claim 18, wherein the instructions for determining that the first UE supports the local routing service comprise instructions for:
determining whether the local routing service request identifier indicates that the first UE has a capability of the local routing service; and
determining the local routing service request identifier indicates that the first UE requests obtaining of the local routing service.

20. The eNB according to claim 18, wherein the local routing service request identifier is at least one of a specific access point name (APN), a specific network attach type, or an ID information in a specific format of the first UE.

* * * * *